(12) United States Patent
Ito et al.

(10) Patent No.: US 7,853,396 B2
(45) Date of Patent: Dec. 14, 2010

(54) MULTIFUEL INTERNAL COMBUSTION ENGINE AND COMBUSTION CONTROLLING METHOD THEREOF

(75) Inventors: Yasushi Ito, Susono (JP); Shiro Tanno, Gotemba (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 102 days.

(21) Appl. No.: 12/442,668

(22) PCT Filed: Jun. 12, 2007

(86) PCT No.: PCT/JP2007/061818

§ 371 (c)(1),
(2), (4) Date: Mar. 24, 2009

(87) PCT Pub. No.: WO2008/038440

PCT Pub. Date: Apr. 3, 2008

(65) Prior Publication Data

US 2010/0010725 A1     Jan. 14, 2010

(30) Foreign Application Priority Data

Sep. 28, 2006   (JP) .............................. 2006-265731

(51) Int. Cl.
| | |
|---|---|
| F02B 17/00 | (2006.01) |
| F02B 3/00 | (2006.01) |
| F02B 5/00 | (2006.01) |
| F02B 13/00 | (2006.01) |
| F02B 7/00 | (2006.01) |
| F01P 7/16 | (2006.01) |
| B60T 7/12 | (2006.01) |

(52) U.S. Cl. .................. 701/103; 123/575; 123/578; 123/577; 123/295; 123/299; 123/300; 123/305; 701/115; 701/101; 701/102; 701/105

(58) Field of Classification Search .................. 123/295, 123/406.3, 406.31, 526, 527, 1 A, 299, 300, 123/304, 305, 575, 27 GE, 430, 431, 674, 123/698, 480, 515, 577, 578; 701/111, 101, 701/102, 103, 104, 105, 106, 115
See application file for complete search history.

(56) References Cited

U.S. PATENT DOCUMENTS 6,230,683 B1 * 5/2001 zur Loye et al. ............ 123/435

(Continued)

FOREIGN PATENT DOCUMENTS

EP     1 857 654 A1    11/2007

(Continued)

*Primary Examiner*—Stephen K Cronin
*Assistant Examiner*—Raza Najmuddin
(74) *Attorney, Agent, or Firm*—Sughrue Mion, PLLC

(57) ABSTRACT

A multifuel internal combustion engine includes: fuel characteristics determining unit that determines ignitability and anti-knocking performance of the fuel introduced into the combustion chamber CC; combustion mode setting unit that sets a compression hypergolic diffusion combustion mode when ignitability of the fuel is excellent, sets a premixed spark-ignition flame propagation combustion mode when the ignitability of the fuel is poor and anti-knocking performance is excellent, and sets a spark assist compression hypergolic diffusion combustion mode when both the ignitability and anti-knocking performance of the fuel are poor; and combustion control execution unit that makes the engine to drive in a combustion mode which is set by the combustion mode setting unit.

14 Claims, 11 Drawing Sheets

U.S. PATENT DOCUMENTS

| | | | |
|---|---|---|---|
| 6,276,334 B1 * | 8/2001 | Flynn et al. | 123/435 |
| 6,286,482 B1 * | 9/2001 | Flynn et al. | 123/435 |
| 6,378,489 B1 * | 4/2002 | Stanglmaier et al. | 123/304 |
| 6,463,907 B1 * | 10/2002 | Hiltner | 123/304 |
| 6,516,774 B2 * | 2/2003 | zur Loye et al. | 123/299 |
| 6,561,157 B2 * | 5/2003 | zur Loye et al. | 123/295 |
| 6,725,827 B2 * | 4/2004 | Ueda et al. | 123/295 |
| 6,843,208 B2 * | 1/2005 | Tamura et al. | 123/27 R |
| 6,981,472 B2 * | 1/2006 | Bromberg et al. | 123/3 |
| 7,165,512 B2 * | 1/2007 | Hashimoto et al. | 123/3 |
| 7,213,567 B2 * | 5/2007 | Cracknell | 123/304 |
| 7,261,065 B2 * | 8/2007 | Aimoto et al. | 123/3 |
| 7,357,101 B2 * | 4/2008 | Boyarski | 123/1 A |
| 7,404,380 B2 * | 7/2008 | Hashimoto et al. | 123/1 A |
| 7,406,947 B2 * | 8/2008 | Lewis et al. | 123/478 |
| 7,412,966 B2 * | 8/2008 | Lewis et al. | 123/431 |
| 7,424,881 B2 * | 9/2008 | Kerns | 123/431 |
| 7,426,925 B2 * | 9/2008 | Leone et al. | 123/575 |
| 7,578,281 B2 * | 8/2009 | Russell et al. | 123/304 |
| 7,581,528 B2 * | 9/2009 | Stein et al. | 123/431 |
| 7,594,498 B2 * | 9/2009 | Lewis et al. | 123/431 |
| 7,597,090 B2 * | 10/2009 | Hashimoto et al. | 123/575 |
| 7,647,899 B2 * | 1/2010 | Dearth et al. | 123/1 A |
| 7,647,916 B2 * | 1/2010 | Leone et al. | 123/432 |
| 7,665,452 B2 * | 2/2010 | Russell et al. | 123/638 |
| 2002/0026926 A1 * | 3/2002 | Loye et al. | 123/435 |
| 2004/0103860 A1 * | 6/2004 | zur Loye et al. | 123/27 R |
| 2007/0221163 A1 * | 9/2007 | Kamio | 123/25 B |
| 2007/0246005 A1 * | 10/2007 | Sobotowski et al. | 123/304 |
| 2008/0006252 A1 * | 1/2008 | Kramer | 123/575 |
| 2009/0012698 A1 * | 1/2009 | Shinagawa et al. | 701/103 |
| 2009/0165759 A1 * | 7/2009 | Sengupta et al. | 123/575 |
| 2009/0194081 A1 * | 8/2009 | Ito et al. | 123/575 |
| 2010/0010725 A1 * | 1/2010 | Ito et al. | 701/103 |

FOREIGN PATENT DOCUMENTS

| | | |
|---|---|---|
| JP | 63-272970 A | 11/1988 |
| JP | 63-297771 A | 12/1988 |
| JP | 09-068061 A | 3/1997 |
| JP | 2001-254660 A | 9/2001 |
| JP | 2002-038981 A | 2/2002 |
| JP | 2004-245126 A | 9/2004 |
| JP | 2005-139945 A | 6/2005 |
| JP | 2006-233839 A | 9/2006 |

* cited by examiner

MULTIFUEL INTERNAL COMBUSTION ENGINE AND COMBUSTION CONTROLLING METHOD THEREOF

TECHNICAL FIELD

The present invention relates to a multifuel internal combustion engine which is driven mainly at a theoretical air fuel ratio by introducing at least one of at least two kinds of fuel having different properties into a combustion chamber, or by introducing mixed fuel including the at least the two kinds of fuel into the combustion chamber.

BACKGROUND ART

Conventionally, a so-called multifuel internal combustion engine which is driven using a plurality of kinds of fuel having different properties is known. For example, Patent Document 1 discloses a multifuel internal combustion engine which is driven using mixed fuel of gasoline and light oil. In the multifuel internal combustion engine, when the engine starts, the mixing ratio of light oil having high ignitability is increased, and the engine is driven in a diffusion combustion manner. When a smoke discharging amount is large or knocking is generated, a mixing ratio of gasoline having high smoke suppressing effect and anti-knocking effect is increased, and the engine is driven in a premixed combustion manner. Patent Document 2 discloses a multifuel internal combustion engine which can be driven using fuel selected by a driver from many kinds of fuel such as gasoline, light oil and ethanol. Patent Document 2 also describes a multifuel internal combustion engine which is driven in a spark-ignition mode when the engine load is smaller than a predetermined load, and which is driven in a compression hypergolic diffusion combustion mode when the engine load is large. As the ignitability of used fuel is higher, the driving region in the compression hypergolic diffusion combustion mode is enlarged.

Patent Document 1: Japanese Patent Application Laid-open No. 9-68061

Patent Document 2: Japanese Patent Application Laid-open No. 2004-245126

DISCLOSURE OF THE INVENTION

Problem to be Solved by the Invention

When driving in a driving mode that depends on properties inherent to specific fuel is continued, however, if the specific fuel is used up, there is a concern that the engine cannot be driven in the driving mode. If such a case occurs, the driving is limited to one in another driving mode that depends on properties of another remaining fuel at any driving conditions. Therefore, the engine performance such as emission control performance and output performance is deteriorated in some cases. Even if kinds of fuel are the same, its quality may differ depending upon destination of a vehicle. Accordingly, for example, even when the fuel is recognized and expected to have high ignitability under normal circumstances, the fuel may not have the desired ignitability in some cases. Therefore, in such a case, only mixed fuel having not only low ignitability, but also low smoke suppressing effect and low anti-knocking performance can be produced, and there is a possibility that the engine performance is deteriorated.

Hence, it is an object of the present invention to provide a multifuel internal combustion engine which improves the inconvenience of the conventional technique, and which can optimally control combustion in accordance with fuel characteristics of fuel introduced into a combustion chamber.

Means for Solving Problem

To achieve the above object, the present invention provides multifuel internal combustion engine which is driven mainly at a theoretical air fuel ratio by introducing at least one of at least two kinds fuel having different properties into a combustion chamber or by introducing mixed fuel including the at least two kinds of fuel into the combustion chamber, the multifuel internal combustion engine includes: fuel characteristics determining unit that determines ignitability and anti-knocking performance of the fuel introduced into the combustion chamber; combustion mode setting unit that sets a compression hypergolic diffusion combustion mode when ignitability of the fuel introduced into the combustion chamber is excellent, sets a premixed spark-ignition flame propagation combustion mode when the ignitability of the fuel introduced into the combustion chamber is poor and anti-knocking performance is excellent, and sets a spark assist compression hypergolic diffusion combustion mode when both the ignitability and anti-knocking performance of the fuel introduced into the combustion chamber are poor; and combustion control execution unit that makes the engine to drive in a combustion mode which is set by the combustion mode setting unit.

In the multifuel internal combustion engine according to the present invention, if the fuel has high ignitability, the compression hypergolic diffusion combustion is carried out for exhibiting excellent engine performance (output performance, emission control performance and fuel consumption performance). If the fuel has poor ignitability, but high anti-knocking performance, the multifuel internal combustion engine carries out the premixed spark-ignition flame propagation combustion for exhibiting excellent engine performance (output performance, emission control performance and fuel consumption performance). If the fuel has poor ignitability and poor anti-knocking performance, the multifuel internal combustion engine assists ignition in the spark assist compression hypergolic diffusion combustion mode and carries out the compression hypergolic diffusion combustion for exhibiting excellent engine performance (output performance, emission control performance and fuel consumption performance).

To achieve the above object, according to the present invention, in the multifuel internal combustion engine of claim 1, the fuel characteristics determining unit further determines evaporativity or PM/smoke generating characteristics of the fuel introduced into the combustion chamber, and the combustion mode setting unit does not select the compression hypergolic diffusion combustion mode when the fuel introduced into the combustion chamber has poor evaporativity or the fuel easily generates PM or smoke.

Generally, when the fuel has high ignitability, but low evaporativity, incomplete combustion takes place and PM and smoke are generated. In the multifuel internal combustion engine according to the present invention, however, when fuel has such characteristics, a combustion mode other than the compression hypergolic diffusion combustion mode (premixed spark-ignition flame propagation combustion mode or spark assist compression hypergolic diffusion combustion mode) is selected to suppress the generation of PM and smoke.

To achieve the above object, according to the present invention, in the multifuel internal combustion engine, when the fuel introduced into the combustion chamber has fuel characteristics that permit setting a plurality of kinds of combustion modes, the combustion mode setting unit selects a combustion mode which is excellent in both or any one of fuel consumption performance and emission control performance.

In the multifuel internal combustion engine according to the present invention, it is possible to set optimal combustion mode which can further enhance the fuel consumption performance and emission control performance.

EFFECT OF THE INVENTION

According to the multifuel internal combustion engine of the present invention, because the optimal combustion mode according to fuel characteristics of fuel introduced into the combustion chamber is set, it is possible to control combustion optimally in accordance with the fuel characteristics. Accordingly, it is possible to exhibit excellent engine performance (output performance, emission control performance, fuel consumption performance and the like).

EXPLANATION OF LETTERS OR NUMERALS

1 Electronic control unit
41A First fuel tank
41B Second fuel tank
91 Cylinder internal pressure sensor
92 Ignition timing sensor
93 Knocking sensor
94 Smoke sensor
cc Combustion chamber
F1 First fuel
F2 Second fuel
Kl Engine load
Ne Revolution of the engine
PC Ignitability index value
Pc0 Ignitability limit value
Pk Anti-knocking performance index value
Pk0 Anti-knocking performance limit value
Pv Evaporativity index value
Pv0 Evaporativity limit value

BEST MODE FOR CARRYING OUT THE INVENTION

Embodiments of a multifuel internal combustion engine according to the present invention will be explained in detail based on the drawings. These embodiments do not limit the invention.

First Embodiment

A first embodiment of the multifuel internal combustion engine of the present invention will be explained based on FIGS. 1 to 4. This multifuel internal combustion engine is driven by introducing at least one of at least two kinds of fuel having different properties into a combustion chamber, or by introducing mixed fuel including the at least two kinds of fuel into the combustion chamber. In the first embodiment, the latter multifuel internal combustion engine will be explained as an example.

Figure 1:
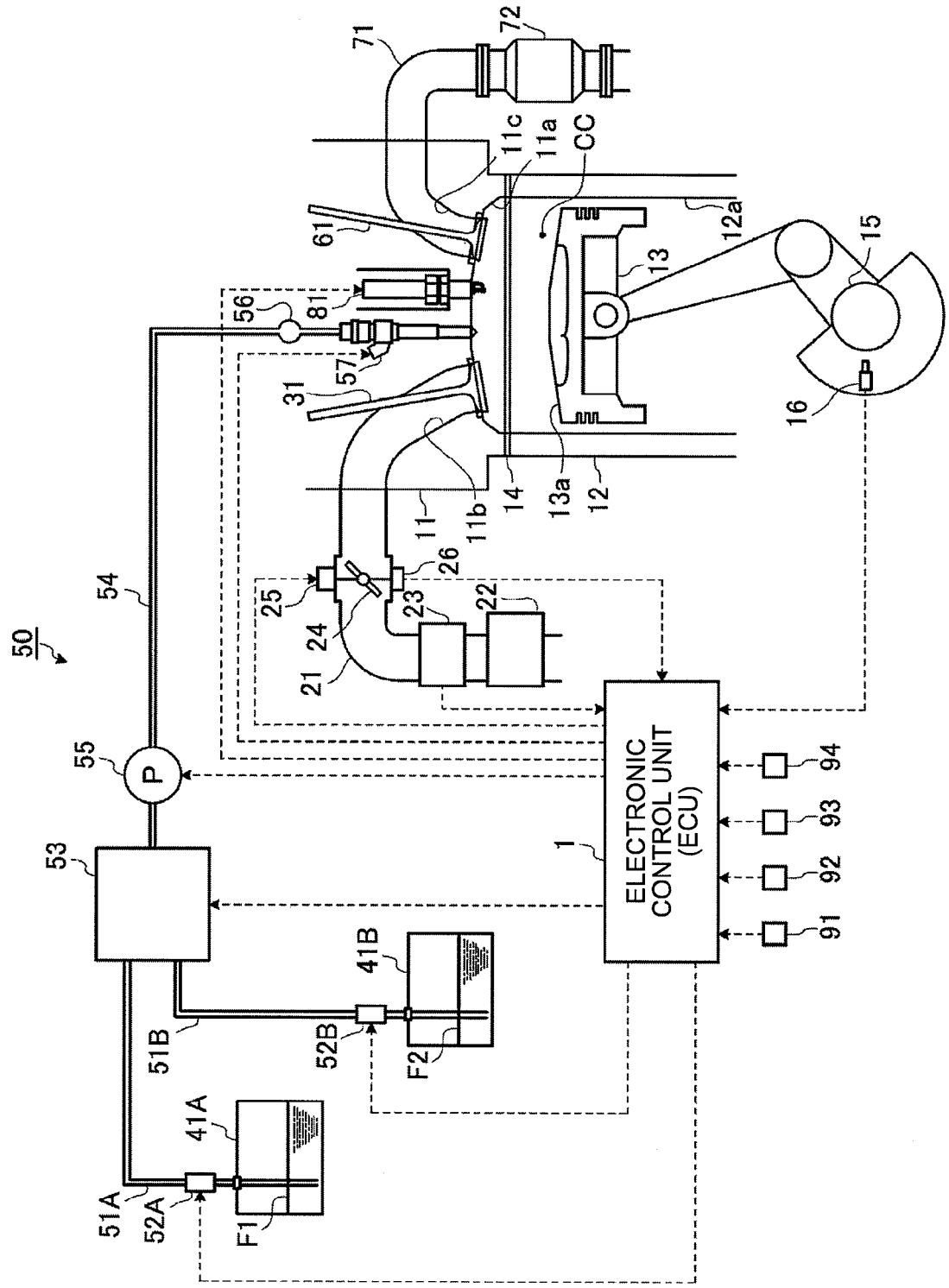
FIG. 1 is a diagram showing structure of first to fourth embodiments of a multifuel internal combustion engine according to the present invention.

In the multifuel internal combustion engine, an electronic control unit (ECU) 1 shown in FIG. 1 performs various control operations such as combustion control. The electronic control unit 1 includes a CPU (central processing unit) (not shown), a ROM (Read Only Memory) in which a predetermined control program and the like are previously stored, a RAM (Random Access Memory) in which calculation results of the CPU are temporarily stored, and a backup RAM in which previously prepared information and the like are stored.

A structure of the multifuel internal combustion engine will be explained first based on FIG. 1. Although FIG. 1 shows one cylinder only, the present invention is not limited to this, and the present invention can also be applied to a multicylinder multifuel internal combustion engine. In the first embodiment, the engine having a plurality of cylinders will be explained.

The multifuel internal combustion engine includes a cylinder head 11, a cylinder block 12 and a piston 13 forming a combustion chamber CC. The cylinder head 11 and the cylinder block 12 are fastened to each other through a head gasket 14 shown in FIG. 1 by a bolt or the like. The piston 13 is disposed reciprocably in a space defined by a recess 11a in a lower surface of the cylinder head 11, and a cylinder bore 12a of the cylinder block 12 formed by the fastening. The combustion chamber CC is formed by a space surrounded by a wall surface of the recess 11a of the cylinder head 11, a wall surface of the cylinder bore 12a and a top surface 13a of the piston 13.

The multifuel internal combustion engine of the first embodiment sends air and fuel to the combustion chamber CC in accordance with driving condition and a combustion mode such as the revolution of the engine and an engine load, and controls the combustion in accordance with the driving condition. The air is taken in from outside through the intake passage 21 and an intake port 11b of the cylinder head 11 shown in FIG. 1. Fuel is supplied using a fuel supply apparatus 50 shown in FIG. 1.

First, an air supply path will be explained. The intake passage 21 of the first embodiment is provided thereon with an air cleaner 22 which removes foreign matters such as dust included in air introduced from outside, and an air flowmeter 23 which detects an amount of air taken in from outside. In the multifuel internal combustion engine, a detection signal of the air flowmeter 23 is sent to the electronic control unit 1, and the electronic control unit 1 calculates the intake air amount, the engine load, and the like based on the detection signal.

A throttle valve 24 which adjusts the amount of air taken into the combustion chamber CC, and a throttle valve actuator 25 which opens and closes the throttle valve 24 are provided on the intake passage 21 downstream from the air flowmeter 23. The electronic control unit 1 of the first embodiment drives and controls the throttle valve actuator 25 in accordance with the driving condition and the combustion mode, and adjusts the valve-opening angle of the throttle valve 24 to a valve opening (i.e., intake air amount) suitable for the driving condition and the like. For example, the throttle valve 24 is adjusted such that the amount of the intake air necessary for attaining an air-fuel ratio according to the driving condition and the combustion mode is taken into the combustion chamber CC. The multifuel internal combustion engine is provided with a throttle opening sensor 26 which detects the valve opening of the throttle valve 24 and sends the detection signal to the electronic control unit 1.

One end of the intake port 11b opens at the combustion chamber CC, an intake valve 31 which opens and closes the opening of the intake port 11b is disposed at the opening portion. The number of the opening may be one or two or more, and the intake valve 31 is disposed in each of the openings. Therefore, in the multifuel internal combustion engine, air is taken into the combustion chamber CC from the intake port 11b by opening the intake valve 31, and the air flow into the combustion chamber CC is shut off by closing the intake valve 31.

As the intake valve 31, there is a valve which is opened and closed by rotation of an intake-side camshaft (not shown) and elastic force of an elastic member (helical spring). In this kind of the intake valve 31, a power transmission mechanism comprising a chain, a sprocket, or the like is interposed between the intake-side camshaft and the crankshaft 15, the intake-side camshaft moves in conjunction with rotation of the crankshaft 15, and the intake valve 31 is opened and closed at preset opening and closing timings. In the multifuel internal combustion engine of the first embodiment, an intake valve 31 which opens and closes in synchronization with rotation of the crankshaft 15 is applied.

The multifuel internal combustion engine may include a variable valve mechanism such as a so-called variable valve timing and lift mechanism which can change the opening and closing timings and the lift amount of the intake valve 31. With this, the opening and closing timings and the lift amount of the intake valve 31 can be changed to suitable ones according to the driving condition and the combustion mode. In the multifuel internal combustion engine, to obtain the same effect as that of the variable valve mechanism, a so-called electromagnetic drive valve which opens and closes the intake valve 31 utilizing electromagnetic force may be used.

Next, the fuel supply apparatus 50 will be explained. The fuel supply apparatus 50 introduces a plurality of kinds of fuel having different properties into the combustion chamber CC. In the first embodiment, two kinds of fuel (first fuel F1 stored in a first fuel tank 41A and second fuel F2 stored in a second fuel tank 41B) having different properties are previously mixed at a predetermined fuel mixing ratio, and the mixed fuel is directly injected into the combustion chamber CC.

More specifically, the fuel supply apparatus 50 includes a first feed pump 52A which pumps the first fuel F1 from the first fuel tank 41A and sends the same to a first fuel passage 51A, a second feed pump 52B which pumps the second fuel F2 from the second fuel tank 41B and sends the same to a second fuel passage 51B, fuel mixing means 53 which mixes the first and second fuel F1 and F2 sent from the first and second fuel passages 51A and 51B, a high pressure fuel pump 55 which pressurizes the mixed fuel produced by the fuel mixing means 53 and sends the same to a high pressure fuel passage 54 under pressure, a delivery passage 56 which distributes the mixed fuel in the high pressure fuel passage 54 to the cylinders, and a fuel injection valve 57 provided in each cylinder for injecting the mixed fuel supplied from the delivery passage 56 into the combustion chamber CC.

In the fuel supply apparatus 50, the first feed pump 52A, the second feed pump 52B, and the fuel mixing means 53 are driven and controlled by the fuel mixing control means of the electronic control unit 1 and with this, mixed fuel at a predetermined fuel mixing ratio is produced by the fuel mixing means 53. For example, the fuel supply apparatus 50 may make the fuel mixing control means of the electronic control unit 1 increase or decrease the discharge amount of each of the first feed pump 52A and the second feed pump 52B to adjust the fuel mixing ratio of the mixed fuel, or the fuel supply apparatus 50 may make the fuel mixing means 53 increase or decrease the mixing ratio of the first and second fuel F1 and F2 in accordance with instructions of the fuel mixing control means to adjust the fuel mixing ratio of the mixed fuel. The fuel mixing ratio may be a preset constant value or a variable value.

The fuel supply apparatus 50 makes fuel injection control means of the electronic control unit 1 drive and control the high pressure fuel pump 55 and the fuel injection valve 57. With this, the produced mixed fuel is injected under desired fuel injection condition such as a fuel injection amount, a fuel injection timing and a fuel injection time period. The fuel injection control means of the electronic control unit 1 makes the high pressure fuel pump 55 send the mixed fuel under pressure, and makes the fuel injection valve 57 inject the same under the fuel injection condition according to the driving condition, the combustion mode, and the like.

The mixed fuel supplied to the combustion chamber CC in this manner, combined with air as described above, is combusted by ignition operation in an ignition mode corresponding to the combustion mode. Gas in the cylinder (combustion gas) after the combustion is discharged from the combustion chamber CC to an exhaust port 11c shown in FIG. 1. An exhaust valve 61 which opens and closes an opening to the combustion chamber CC is disposed in the exhaust port 11c. The number of the opening may be one or two or more, and the exhaust valve 61 is disposed in each of the openings. Therefore, in this multifuel internal combustion engine, combustion gas is discharged from the combustion chamber CC to the exhaust port 11c by opening the exhaust valve 61, and the discharge of the combustion gas to the exhaust port 11c is shut off by closing the exhaust valve 61.

As the exhaust valve 61, like the intake valve 31, a valve in which a power transmitting mechanism is interposed, a valve having a variable valve mechanism such as the so-called variable valve timing and lift mechanism, and the so-called electromagnetic drive valve can be applied.

In the multifuel internal combustion engine of the first embodiment, combustion gas ("exhaust gas", hereinafter) discharged into the exhaust port 11c is discharged into atmosphere through an exhaust passage 71 shown in FIG. 1. An exhaust catalyst device 72 which purifies harmful component in the exhaust gas is disposed on the exhaust passage 71.

Generally, known examples of the exhaust catalyst device 72 include a three-way catalyst which exhibits effective purifying effect for hydrocarbon (HC), carbon monoxide (CO) and nitrogen oxides (NOx) in the exhaust gas generated in theoretical air fuel ratio driving and transient air fuel ratio driving, and a lean NOx catalyst (NOx absorbing reductive catalyst) which exhibits effective purifying effect for NOx in exhaust gas which is generated in a large volume by the lean-burn air fuel ratio driving. However, the lean NOx catalyst is more expensive than the three-way catalyst. Further, because the lean NOx catalyst has a limited absorbing amount of NOx, if the capacity is small, it is necessary to reduce the absorbed NOx by frequently carrying out the theoretical air fuel ratio driving and transient air fuel ratio driving, and there is a concern that portions of HC, CO and NOx generated at the time of reduction may be discharged into atmosphere.

Hence, in the multifuel internal combustion engine of the first embodiment, the air fuel ratio in the combustion chamber CC is driven and controlled mainly to the theoretical air fuel ratio, and in order to effectively purify HC, CO and NOx in the exhaust gas generated during the driving, the three-way catalyst is applied as the exhaust catalyst device 72.

In the internal combustion engine, generally, the combustion mode is roughly divided into a diffusion combustion mode and a flame propagation combustion mode. As ignition modes corresponding to these modes, a compression hypergolic mode and a premixed spark-ignition mode are prepared. In the following description, these are collectively called combustion modes, and they are called a compression hypergolic diffusion combustion mode and a premixed spark-ignition flame propagation combustion mode, respectively.

First, the compression hypergolic diffusion combustion mode is a combustion mode in which high pressure fuel is injected into high temperature compressed air formed in the combustion chamber CC in the compression stroke, a portion of the fuel is accordingly self-ignited, and the combustion is proceeded while the fuel and air are dispersed and mixed. Here, because the compressed air and the fuel in the combustion chamber CC are not mixed easily instantaneously, the air fuel ratio becomes uneven at some portions immediately after the injection of the fuel is started. At the time of diffusion combustion, it is preferable that fuel having excellent ignitability as described later is used generally. Such fuel having excellent ignitability is self-ignited in a portion of air fuel ratio suitable for combustion before the injection of the entire fuel is completed. Thus, in the compression hypergolic diffusion combustion mode, fuel present at a portion where the air fuel ratio is suitable for combustion is first self-ignited, and flame formed by the ignition catches remaining fuel and air and combustion proceeds gradually.

To operate the engine in the compression hypergolic diffusion combustion mode, fuel having excellent ignitability and having ignition point lower than compression heat of the compressed air is normally required. Examples of the fuel having high ignitability are light oil and dimethy ether. In recent years, GTL (Gas To Liquids) fuel has received attention as alternative fuel of the light oil, and it is easy to produce GTL fuel having desired properties. Therefore, as the fuel having high ignitability, it is possible to use the GTL fuel produced to enhance the ignitability. The fuel having high ignitability can realize the compression hypergolic diffusion combustion, reduce the amount of NOx generated when the engine is driven in the compression hypergolic diffusion combustion mode, and suppress noise and vibration at the time of combustion.

The premixed spark-ignition flame propagation combustion mode is a combustion mode in which fuel and air are previously mixed to form premixed air-fuel mixture in the combustion chamber CC, ignition source is given to the premixed air-fuel mixture by spark-ignition, flame is propagated around the ignition source and combustion proceeds. The premixed spark-ignition flame propagation combustion mode includes combustion modes such as a homogeneous combustion mode in which homogeneously premixed air-fuel mixture is ignited, and a stratified combustion in which premixed air-fuel mixture having high density is formed around ignition means, lean premixed air-fuel mixture is formed around the premixed air-fuel mixture, and the dense premixed air-fuel mixture is ignited.

The premixed spark-ignition flame propagation combustion mode driving is generally different from the compression hypergolic diffusion combustion mode driving, in that, in the former mode, knocking is prone to occur due to abnormal combustion. Therefore, it is conceived that a fuel suitable for the premixed spark-ignition flame propagation combustion mode is generally fuel having high anti-knocking performance such as gasoline. Known examples of fuel having high anti-knocking performance are GTL fuel produced as having high anti-knocking performance and alcohol fuel in addition to gasoline.

The multifuel internal combustion engine of the first embodiment can be driven in both the combustion modes. Therefore, the multifuel internal combustion engine of the first embodiment has a spark plug 81 shown in FIG. 1 which spark-ignites the premixed air-fuel mixture so that the engine can drive in the premixed spark-ignition flame propagation combustion mode. If an ignition timing suitable for the driving condition of the premixed spark-ignition flame propagation combustion mode has come, the spark plug 81 executes the spark-ignition in accordance with instructions of the electronic control unit 1.

In the first embodiment, fuel having high ignitability and low anti-knocking performance is stored as the first fuel F1 in the first fuel tank 41A, and fuel having high anti-knocking performance and low ignitability is stored as the second fuel F2 in the second fuel tank 41B. For example, light oil is stored as the first fuel F1 and gasoline is stored as the second fuel F2. As the fuel which is introduced into the combustion chamber CC of the first embodiment, various fuel characteristics of the fuel F1 and F2 must be comprehensively taken into account, but if the fuel mixing ratio of the first fuel F1 is high, such fuel characteristics that the ignitability is excellent and the anti-knocking performance is poor are obtained, and if the fuel mixing ratio of the second fuel F2 is high, such fuel characteristics that ignitability is poor and anti-knocking performance is excellent are obtained.

Here, "fuel introduced into the combustion chamber CC" means mixed fuel when the mode in which mixed fuel of the first and second fuel F1 and F2 mixed by the fuel mixing means 53 is sent to the combustion chamber CC is employed like the multifuel internal combustion engine of the first embodiment. When a mode in which the first and second fuel F1 and F2 are individually supplied to the combustion chamber CC is employed like the multifuel internal combustion engine shown in later-described FIG. 12, the first and second fuel F1 and F2 collectively corresponds to the "fuel introduced into the combustion chamber CC". In this case, if the supply ratio of the first fuel F1 is high, such fuel characteristics that ignitability is excellent and anti-knocking performance is poor are obtained, and if the supply ratio of the second fuel F2 is high, such fuel characteristics that ignitability is poor and anti-knocking performance is excellent are obtained.

Here, even if the kinds of fuel are the same, the quality differs largely or slightly depending upon the sales regions, and even if fuel having excellent ignitability is obtained in a certain region, it does not always mean that fuel having the same ignitability can be obtained. Therefore, when fuel whose fuel characteristics do not fall in a predetermined range is used in a general internal combustion engine, there is a possibility of combustion failure, output reduction, deterioration of emission control performance, and the like. However, it is not realistic to change properties of obtained fuel to desired properties, or to seek fuel having desired properties after he or she enters a region where such fuel cannot be obtained. Thus, it is preferable to prevent deterioration of the engine performance only by responding to the changes in properties of the fuel on the side of the engine, and in particular by changing the combustion control mode such as a combustion mode and a fuel mixing ratio.

Hence, the electronic control unit 1 of the first embodiment has fuel characteristics determining means for determining the fuel characteristics (at least ignitability and anti-knocking performance) of fuel introduced into the combustion chamber CC, and combustion mode setting means for setting a combustion mode in accordance with a result of the determination.

First, the fuel characteristics determining means will be explained.

The ignitability and anti-knocking performance of fuel can be expressed using index values in which good or poor of the ignitability and anti-knocking performance are expressed by means of indexes. Therefore, the fuel characteristics determining means of the first embodiment detects an index value of ignitability ("ignitability index value", hereinafter) Pc of fuel which is introduced into the combustion chamber CC, and an index value ("anti-knocking performance index value", hereinafter) Pk of the anti-knocking performance. These values and predetermined threshold values which are switching conditions of the combustion modes are compared with each other. Thereby it is determined whether the ignitability and anti-knocking performance of fuel which is introduced into the combustion chamber CC are good or poor.

More specifically, as the ignitability index value Pc, it is possible to utilize a cetane value of fuel introduced into the combustion chamber CC, and ignition delay period at the time of the compression hypergolic diffusion combustion. For example, the cetane value of fuel introduced into the combustion chamber CC can be known from properties of the first and second fuel F1 and F2 recognized by the fuel characteristics determining means at the time of refueling. In the first embodiment, however, because the first and second fuel F1 and F2 are sent to the combustion chamber CC after they are mixed at the predetermined fuel mixing ratio in the fuel mixing means 53, it is not possible to precisely know the cetane value of the fuel (mixed fuel) introduced into the combustion chamber CC unless the fuel mixing ratio is also taken into account. Therefore, the fuel characteristics determining means of the first embodiment calculates a cetane value of fuel (mixed fuel) introduced into the combustion chamber CC based on the cetane values of the first and second fuel F1 and F2 and fuel mixing ratios thereof. The cetane values of the first and second fuel F1 and F2 obtained by the fuel characteristics determining means at the time of refueling may be recognized by providing a vehicle with an input device through which a refueling operator inputs properties of the first and second fuel F1 and F2, or may be recognized by sending and receiving refueling information such as a kind and properties of fuel to be supplied and an amount of refueling between the refueling facility and the vehicle through a communication device. The ignition delay period at the time of the compression hypergolic diffusion combustion can be detected using detection signals of a cylinder internal pressure sensor 91, an ignition timing sensor 92 and a crank angle sensor 16 shown in FIG. 1 at the time of the compression hypergolic diffusion combustion.

Here, as a threshold value when ignitability is determined, an ignitability index value ("ignitability limit value", hereinafter) Pc0 of minimum (lowest) ignitability capable of realizing the compression hypergolic diffusion combustion without deteriorating engine performance (output performance, emission control performance, fuel consumption performance, and the like) is set. The ignitability limit value Pc0 is increased as the revolution Ne of the engine becomes higher and the engine load Kl becomes lower. Therefore, in the first embodiment, an ignitability limit value Pc0 according to the driving condition (the revolution Ne of the engine and engine load Kl) is previously obtained by experiment or simulation, and the correspondence relation thereof is prepared as ignitability limit value map data shown in FIG. 2.

As the anti-knocking performance index value Pk, it is possible to utilize an octane value of fuel introduced into the combustion chamber CC and information of a trace knock ignition timing at the time of knocking control. The octane value can be obtained in the same manner as the cetane value. When the trace knock ignition timing is applied, it is possible to utilize, as an anti-knocking performance index value Pk, a relation between the trace knock ignition timing and the reference ignition timing at the time of knocking control carried out based on a detection signal of the knocking sensor 93 shown in FIG. 1.

As a threshold value when the anti-knocking performance is determined, an anti-knocking performance index value ("anti-knocking performance limit value", hereinafter) Pk0 of the minimum (lowest) anti-knocking performance capable of realizing the premixed spark-ignition flame propagation combustion without generating knocking (more preferably without deteriorating engine performance) caused by at least abnormal combustion is set. The anti-knocking performance limit value Pk0 becomes greater as the revolution Ne of the engine becomes lower and higher and as the engine load Kl becomes higher. Thus, in the first embodiment, the anti-knocking performance limit value Pk0 according to driving condition (the revolution Ne of the engine and engine load Kl) is previously obtained by experiment or simulation, and a correspondence relation thereof is prepared as anti-knocking performance limit value map data shown in FIG. 3.

Next, the combustion mode setting means will be explained.

Generally, in the internal combustion engine, higher output can be obtained in the compression hypergolic diffusion combustion mode driving than in the premixed ignition flame propagation combustion mode driving. Therefore, in the first embodiment, if fuel introduced into the combustion chamber CC has excellent ignitability, the combustion mode setting means sets the compression hypergolic diffusion combustion mode.

If the ignitability of fuel introduced into the combustion chamber CC is poor, but the anti-knocking performance is excellent, it is possible to carry out excellent premixed spark-ignition flame propagation combustion, although a possibility is high that the fuel cannot be self-ignited in the compressed air or fire is put off after the fuel is self-ignited. Therefore, in the case of such fuel, the combustion mode setting means sets a premixed spark-ignition flame propagation combustion mode.

When fuel introduced into the combustion chamber CC is poor in both ignitability and anti-knocking performance, the engine cannot be driven in the compression hypergolic diffusion combustion mode or premixed spark-ignition flame propagation combustion mode. However, in the case of such fuel, if ignition source is given even forcibly, it is possible to carry out the excellent compression hypergolic diffusion combustion thereafter. Therefore, in the multifuel internal combustion engine of the first embodiment, a spark assist compression hypergolic diffusion combustion mode in which the spark plug 81 assists the ignition to carry out the compression hypergolic diffusion combustion (spark assist compression hypergolic diffusion combustion) is also prepared, and in the case of such fuel, the combustion mode setting means sets the spark assist compression hypergolic diffusion combustion mode.

The electronic control unit 1 of the first embodiment also has combustion control execution means. The multifuel internal combustion engine is driven by the combustion control execution means in the combustion mode that the combustion mode setting means sets. At that time, the combustion control execution means drives the engine mainly at the theoretical air fuel ratio irrespective of the combustion modes only at any time of normal driving except when abrupt combustion temperature rise is required as in the engine cooling operation.

Figure 4:
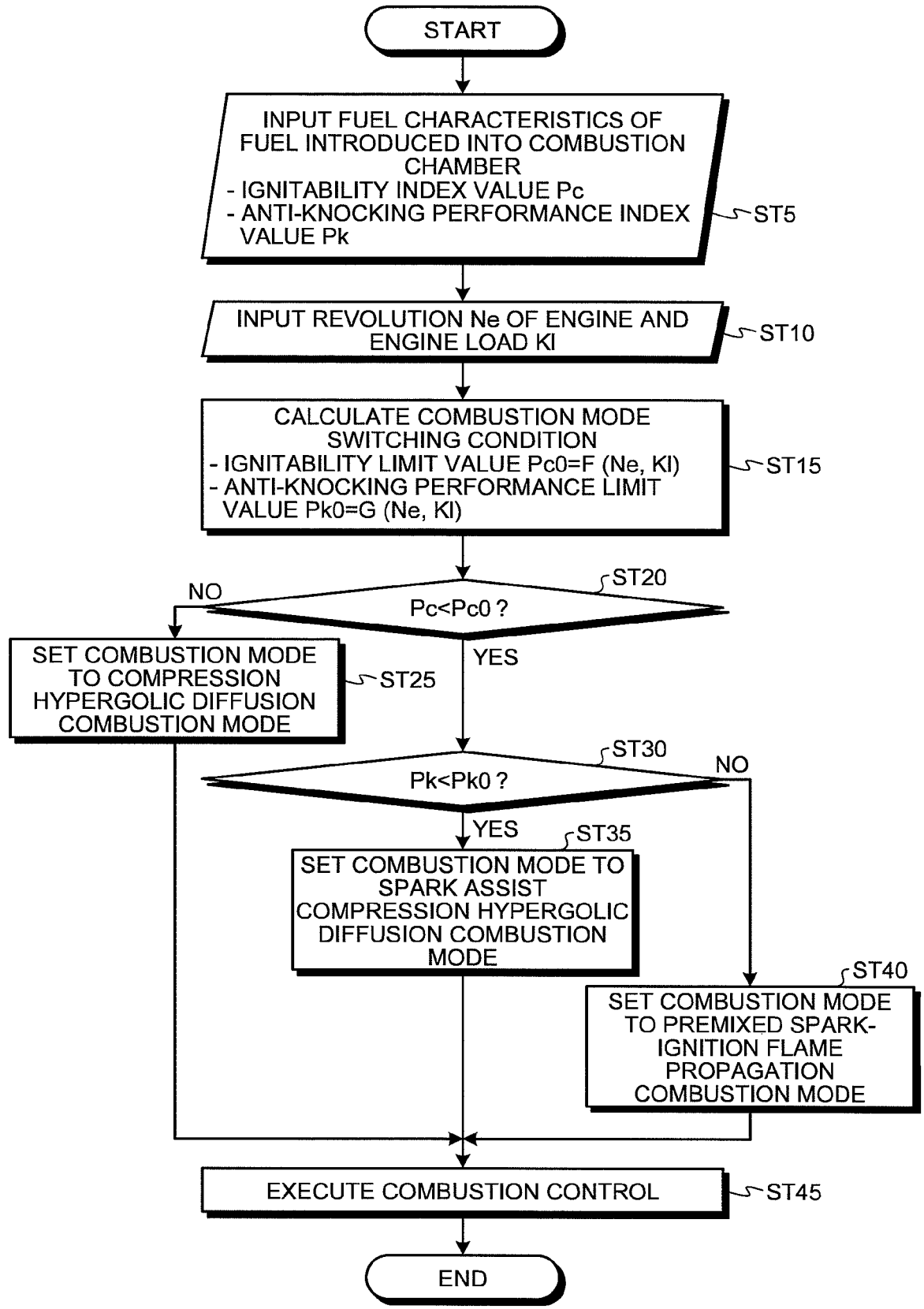
FIG. 4 is a flowchart for explaining operation of the multifuel internal combustion engine of the first embodiment.

Next, one example of control operation of the electronic control unit 1 of the first embodiment will be explained based on a flowchart shown in FIG. 4.

First, fuel characteristics (ignitability index value Pc and anti-knocking performance index value Pk) of fuel introduced into the combustion chamber CC detected as described above by the fuel characteristics determining means, and driving conditions (the revolution Ne of the engine and engine load Kl) known by the detection signals from the crank angle sensor 16 and the air flowmeter 23 are input to the electronic control unit 1 of the first embodiment.

Figure 2:
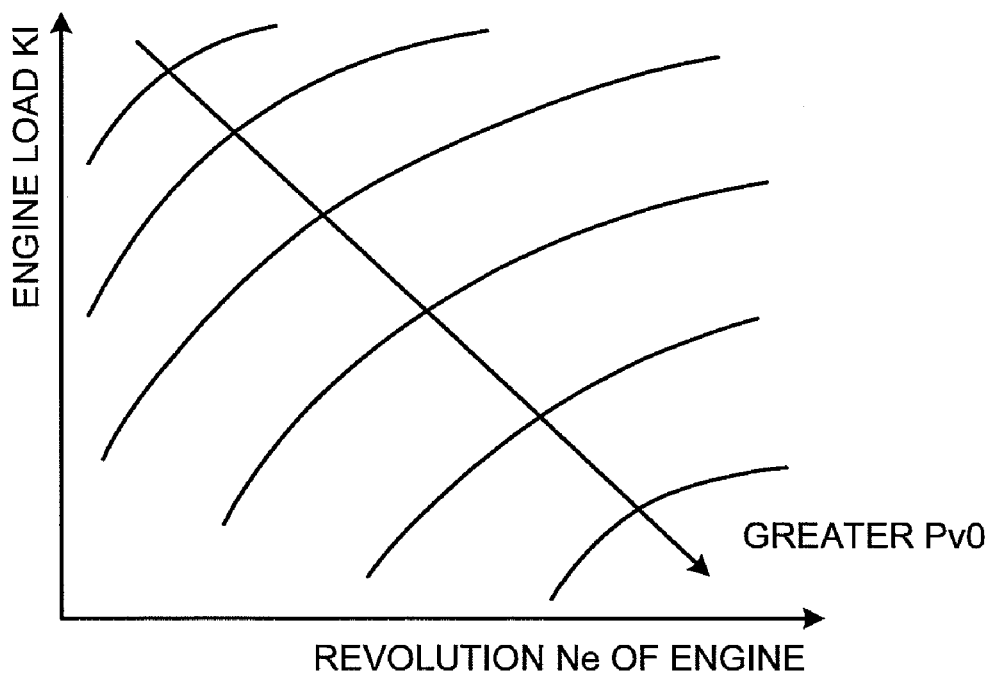
FIG. 2 is a diagram showing one example of ignitability limit value map data.
Figure 3:
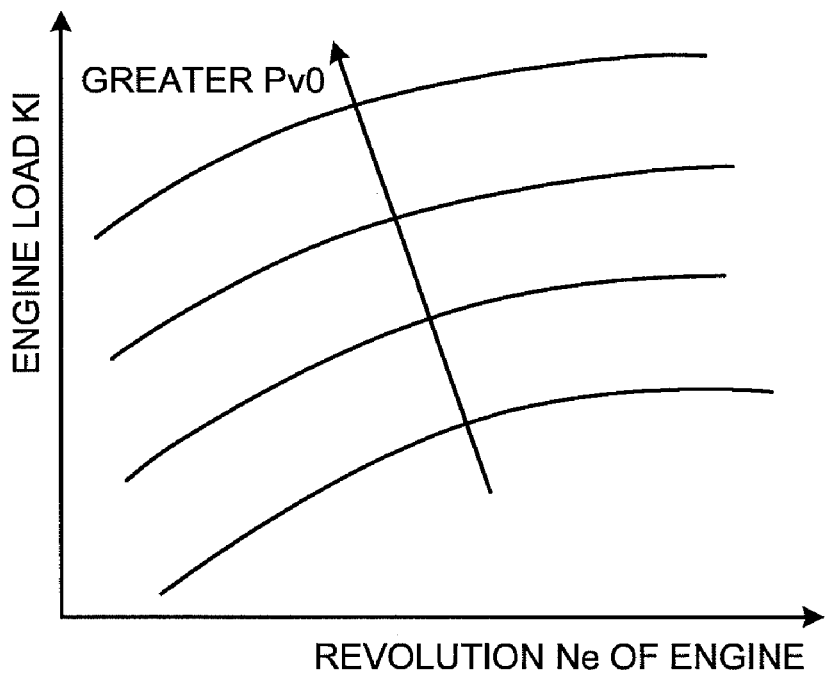
FIG. 3 is a diagram showing one example of anti-knocking performance limit value map data.

The combustion mode setting means of the electronic control unit 1 applies a driving condition in Step ST10 (the revolution Ne of the engine and engine load Kl) to the ignitability limit value map data shown in FIG. 2 and the anti-knocking performance limit value map data shown in FIG. 3, and obtains the corresponding combustion mode switching conditions (ignitability limit value Pc0 and anti-knocking performance limit value Pk0) (Step ST15).

Next, the combustion mode setting means compares the ignitability index value Pc and the ignitability limit value Pc0 with each other (Pc<Pc0?), and determines whether ignitability of fuel introduced into the combustion chamber CC is good or poor (Step ST20).

If No (poor) in Step ST20 and it becomes apparent that fuel introduced into the combustion chamber CC has high ignitability, the combustion mode setting means sets the compression hypergolic diffusion combustion mode as a combustion mode (Step ST25).

If Yes in Step ST20 and it becomes apparent that fuel introduced into the combustion chamber CC has poor ignitability, the combustion mode setting means compares the anti-knocking performance index value Pk and the anti-knocking performance limit value Pk0 with each other (Pk<Pk0?), and determines whether anti-knocking performance of fuel introduced into the combustion chamber CC is good or poor (Step ST30).

If Yes in Step ST30 and it becomes apparent that fuel introduced into the combustion chamber CC is poor in both ignitability and anti-knocking performance, the combustion mode setting means sets the spark assist compression hypergolic diffusion combustion mode as the combustion mode (Step ST35).

If No in Step ST30 and it becomes apparent that fuel introduced into the combustion chamber CC has high anti-knocking performance, the combustion mode setting means sets the premixed spark-ignition flame propagation combustion mode as the combustion mode (Step ST40).

According to the electronic control unit 1 of the first embodiment, the combustion control execution means controls combustion such that the engine is driven at the theoretical air fuel ratio in the combustion mode which is set in this manner (Step ST45).

Accordingly, if fuel introduced into the combustion chamber CC has high ignitability, the multifuel internal combustion engine of the first embodiment can carry out the compression hypergolic diffusion combustion at excellent theoretical air fuel ratio. If the fuel has high anti-knocking performance, the multifuel internal combustion engine can carry out the premixed spark-ignition flame propagation combustion at the excellent theoretical air fuel ratio. Even if fuel introduced into the combustion-chamber CC is poor in both ignitability and anti-knocking performance, if ignition is assisted by the spark assist compression hypergolic diffusion combustion mode driving, the multifuel internal combustion engine can carry out excellent compression hypergolic diffusion combustion at the theoretical air fuel ratio.

The multifuel internal combustion engine of the first embodiment is driven mainly at the theoretical air fuel ratio in a combustion mode adapted to the fuel characteristics of fuel introduced into the combustion chamber CC. Therefore, it is possible to secure output performance and fuel consumption performance suitable for individual combustion mode, and to purify harmful component in the generated exhaust gas by the exhaust catalyst device 72 (three-way catalyst), to optimally control the combustion in accordance with the fuel characteristics, and to exhibit excellent engine performance (output performance, emission control performance, fuel consumption performance, and the like).

Second Embodiment

Next, a second embodiment of the multifuel internal combustion engine according to the present invention will be explained based on FIGS. 5 and 6.

In the multifuel internal combustion engine of the first embodiment, if fuel introduced into the combustion chamber CC has high ignitability, the compression hypergolic diffusion combustion mode is selected solely on the ground of the fact. However, at the time of driving in the compression hypergolic diffusion combustion mode, even if ignitability is high, the mixed state between fuel and air becomes uneven and incomplete combustion occurs if evaporativity is low and thus, particulate matter (PM) or smoke is generated.

Hence, in the second embodiment, the fuel characteristics determining means also determines evaporativity of fuel introduced into the combustion chamber CC. If the fuel does not have predetermined evaporativity, a combustion mode other than the compression hypergolic diffusion combustion mode is selected.

Here, like the ignitability and anti-knocking performance, an index value ("evaporativity index value", hereinafter) Pv in which a good or poor of evaporativity of fuel introduced into the combustion chamber CC is expressed by means of indexes is detected. This is compared with a threshold value ("evaporativity limit value", hereinafter) Pv0 as a combustion mode switching condition, thereby determining whether the evaporativity of fuel is good or poor.

More specifically, as the evaporativity index value Pv, it is possible to utilize a smoke amount in exhaust gas at the time of compression hypergolic diffusion combustion. The smoke amount is detected by a smoke sensor 94 shown in FIG. 1 disposed on the exhaust passage 71. Therefore, the fuel characteristics determining means of the second embodiment may determine characteristics (PM/smoke generating characteristics) of generation easiness of PM or smoke from the same smoke amount instead of the evaporativity.

As the evaporativity limit value Pv0, an evaporativity index value of minimum (lowest) evaporativity capable of preventing PM or smoke from being generated when the engine is driven in the compression hypergolic diffusion combustion mode is set. The evaporativity limit value Pv0 becomes greater as the revolution Ne of the engine becomes higher or the engine load Kl becomes higher. In the second embodiment, a value corresponding to the driving condition (the revolution Ne of the engine and engine load Kl) is previously obtained by experiment or simulation, and a correspondence relation is prepared as evaporativity limit value map data shown in FIG. 5.

One example of control operation of the electronic control unit 1 according to the second embodiment will be explained based on a flowchart shown in FIG. 6. Redundant contents overlapping the control operation of the first embodiment will be omitted or simplified as need arises.

Fuel characteristics (ignitability index value Pc, anti-knocking performance index value Pk and evaporativity index value Pv) of fuel introduced into the combustion chamber CC detected by the fuel characteristics determining means, and driving condition (the revolution Ne of the engine and engine load Kl) are input to the electronic control unit 1 of the second embodiment (Steps ST6 and ST10).

Figure 5:
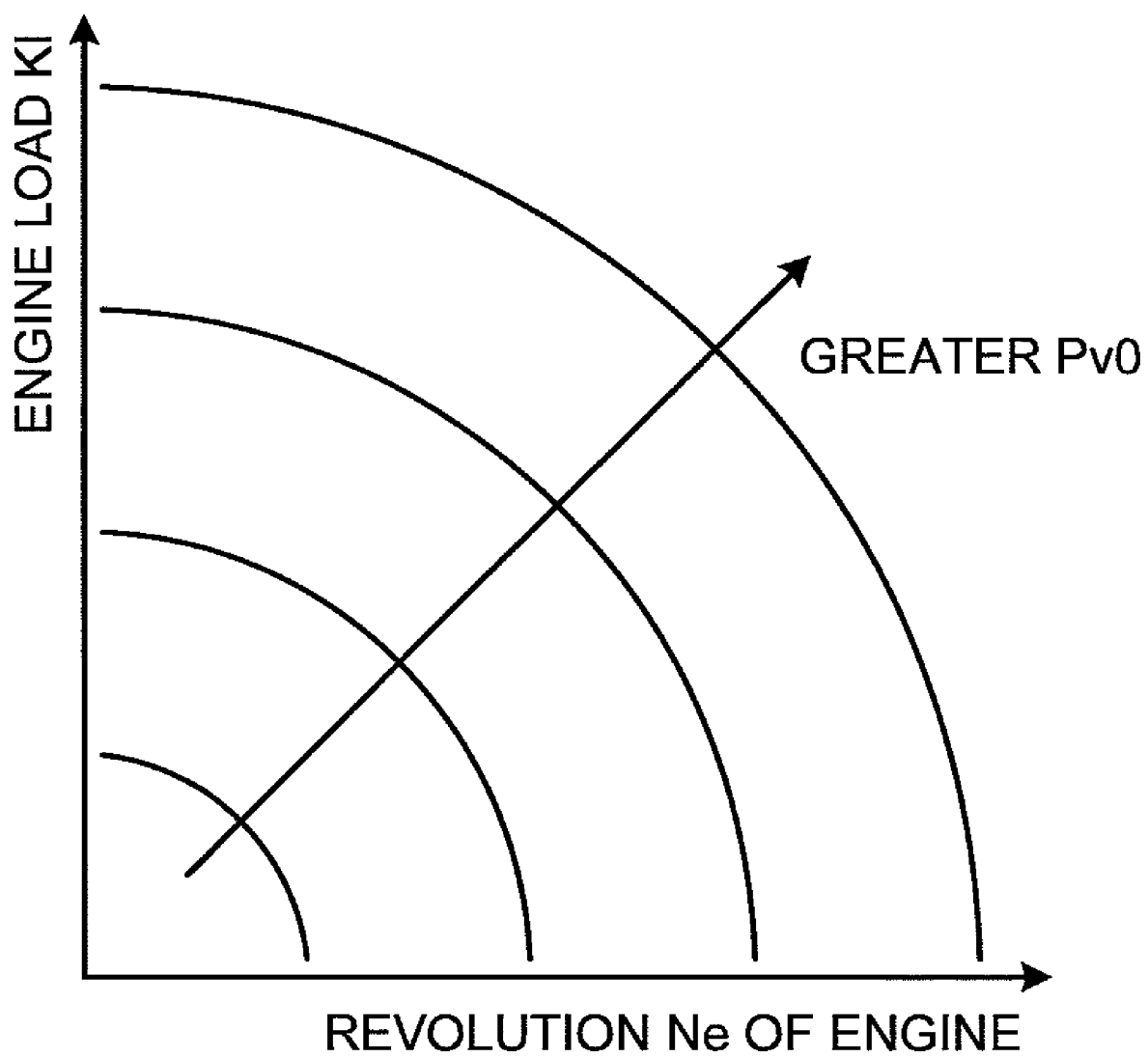
FIG. 5 is a diagram showing one example of evaporativity resistant limit value map data.
Figure 6:
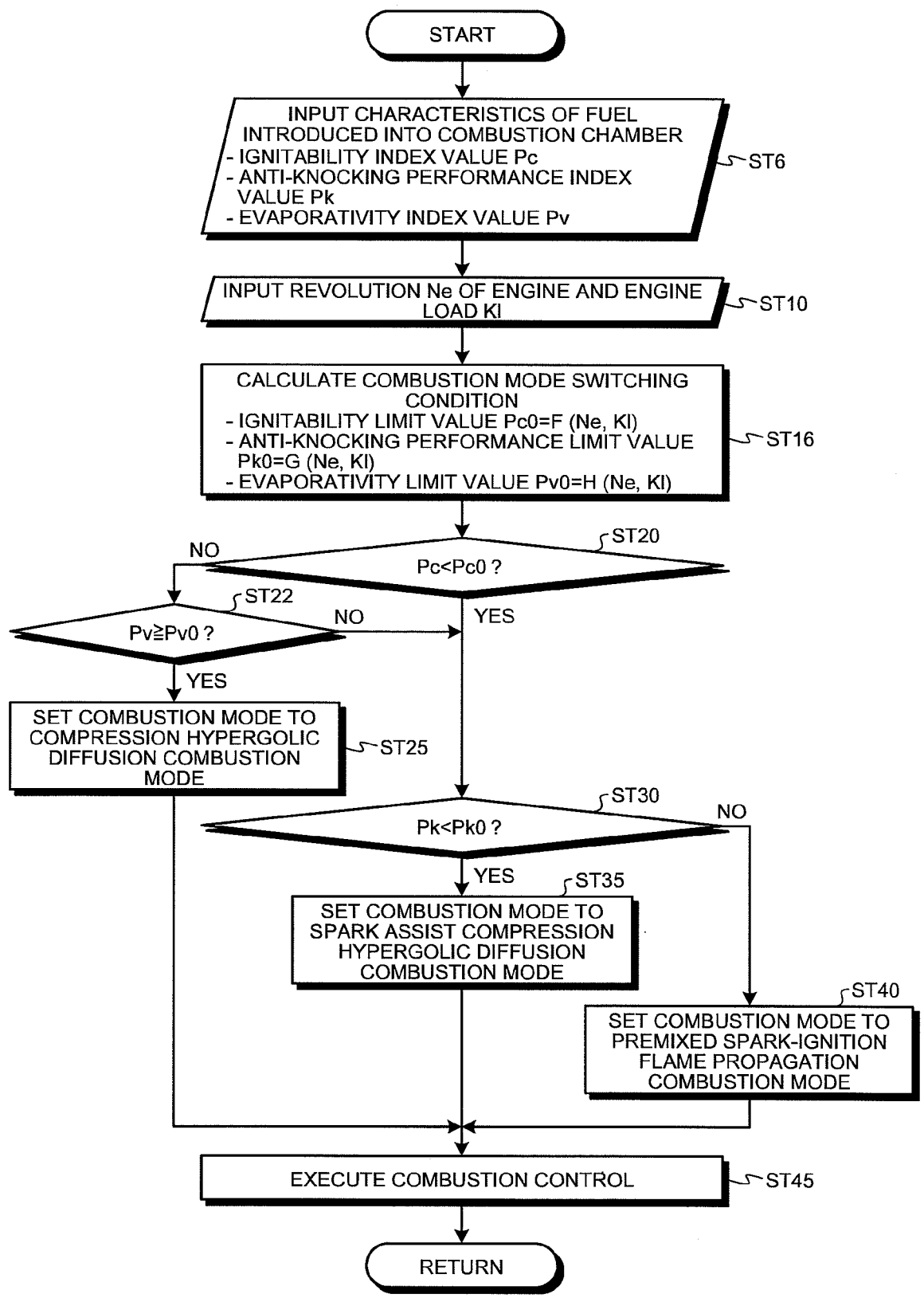
FIG. 6 is a flowchart for explaining operation of a multifuel internal combustion engine of the second embodiment.

The combustion mode setting means of the electronic control unit 1 applies the driving condition of Step ST10 (the revolution Ne of the engine and engine load Kl) to the ignitability limit value map data shown in FIG. 2, the anti-knocking performance limit value map data shown in FIG. 3 and the evaporativity limit value map data shown in FIG. 5, and obtains the respective combustion mode switching conditions (ignitability limit value Pc0, anti-knocking performance limit value Pk0, and evaporativity limit value Pv0) (Step ST16).

The combustion mode setting means of the second embodiment compares the ignitability index value Pc and the ignitability limit value Pc0 with each other as in the first embodiment, and determines whether the ignitability of fuel introduced into the combustion chamber CC is good or poor (Step ST20). If No in Step ST20 and it becomes apparent that the fuel introduced into the combustion chamber CC has high ignitability, the evaporativity index value Pv and the evaporativity limit value Pv0 are compared with each other (Pv≧Pv0?), and it is determined whether the evaporativity of fuel introduced into the combustion chamber CC is good or poor (Step ST22).

If Yes in Step ST22 and it becomes apparent that fuel introduced into the combustion chamber CC has high ignitability and high evaporativity, the combustion mode setting means sets compression hypergolic diffusion combustion mode as the combustion mode (Step ST25).

If No in Step ST22 and it becomes apparent that fuel introduced into the combustion chamber CC has high ignitability, but poor evaporativity, the combustion mode setting means compares anti-knocking performance index value Pk and anti-knocking performance limit value Pk0 with each other, and determines whether the anti-knocking performance of fuel introduced into the combustion chamber CC is good or poor (Step ST30), and selects a combustion mode (spark assist compression hypergolic diffusion combustion mode or premixed spark-ignition flame propagation combustion mode) in accordance with good or poor of the anti-knocking performance (Steps ST35 and ST40).

In the second embodiment also, the combustion control execution means of the electronic control unit 1 controls combustion such that the engine is driven at the theoretical air fuel ratio in the set combustion mode (Step ST45).

Accordingly, if fuel introduced into the combustion chamber CC has high ignitability and high evaporativity, the multifuel internal combustion engine of the second embodiment can carry out compression hypergolic diffusion combustion at excellent theoretical air fuel ratio without generating PM or smoke.

In the second embodiment, when fuel introduced into the combustion chamber CC has poor evaporativity, if the fuel introduced into the combustion chamber CC has high anti-knocking performance, the engine carries out premixed spark-ignition flame propagation combustion at excellent theoretical air fuel ratio, and if the fuel has poor anti-knocking performance, the engine carries out spark assist compression hypergolic diffusion combustion. However, in the multifuel internal combustion engine in such a case, the spark plug 81 ignites irrespective of kinds of the combustion mode, it is less possible that incomplete combustion occurs even when the fuel has low evaporativity. Thus, the multifuel internal combustion engine of the second embodiment can carry out excellent theoretical air fuel ratio operation in accordance with a combustion mode without generating PM or smoke even if the fuel introduced into the combustion chamber CC has poor evaporativity.

Because the multifuel internal combustion engine of the second embodiment is driven mainly at theoretical air fuel ratio in a combustion mode which is more adapted to characteristics of fuel introduced into the combustion chamber CC than that of the first embodiment, it is possible to purify harmful component in the generated exhaust gas by the exhaust catalyst device 72 (three-way catalyst) while keeping output performance and fuel consumption performance suitable for respective combustion modes, and it is possible to exhibit excellent engine performance (output performance, emission control performance, fuel consumption performance, and the like) while optimally controlling combustion in accordance with fuel characteristics.

Third Embodiment

Figure 7:
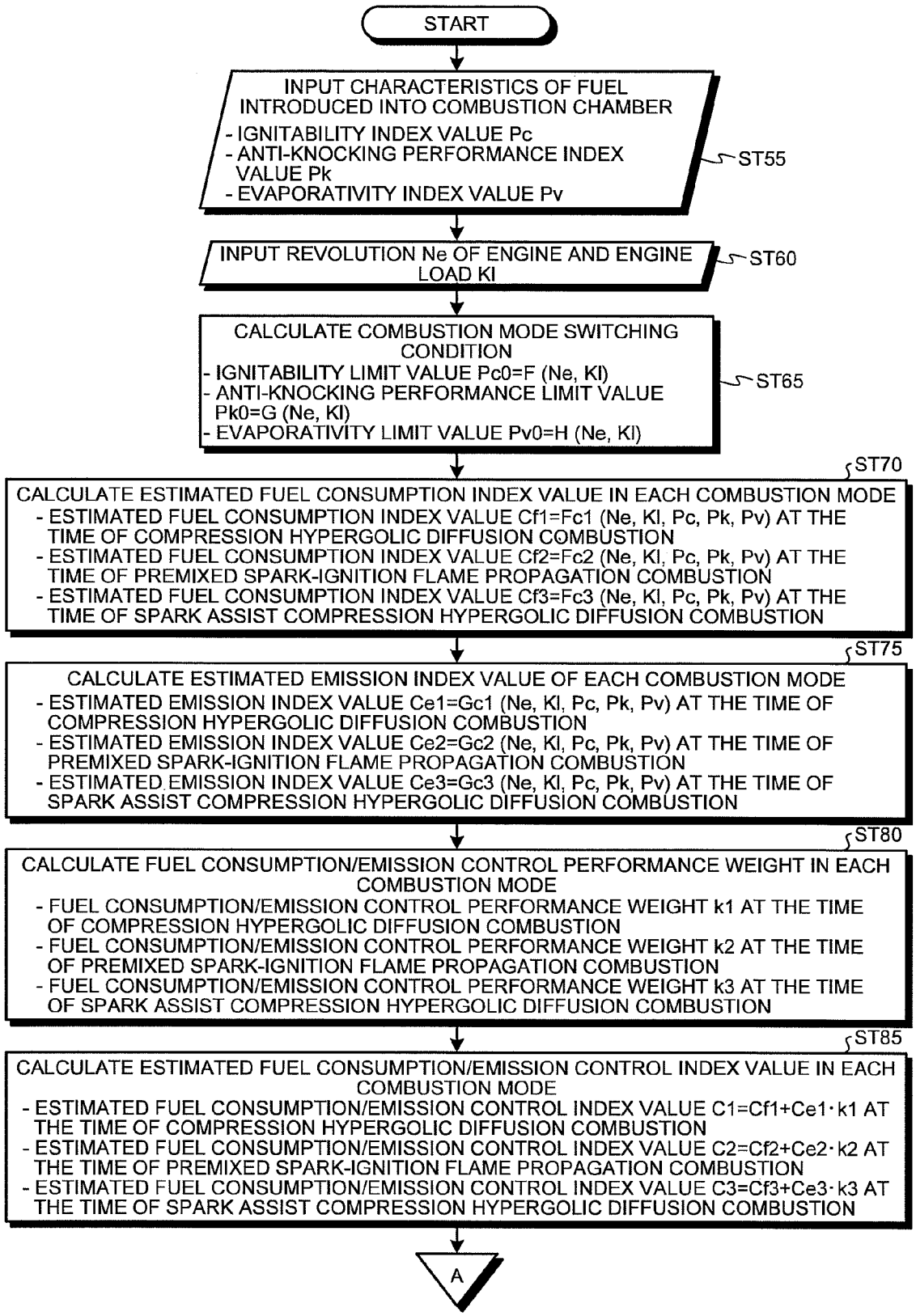
FIG. 7 is a flowchart for explaining operation of a multifuel internal combustion engine of the third embodiment.
Figure 8:
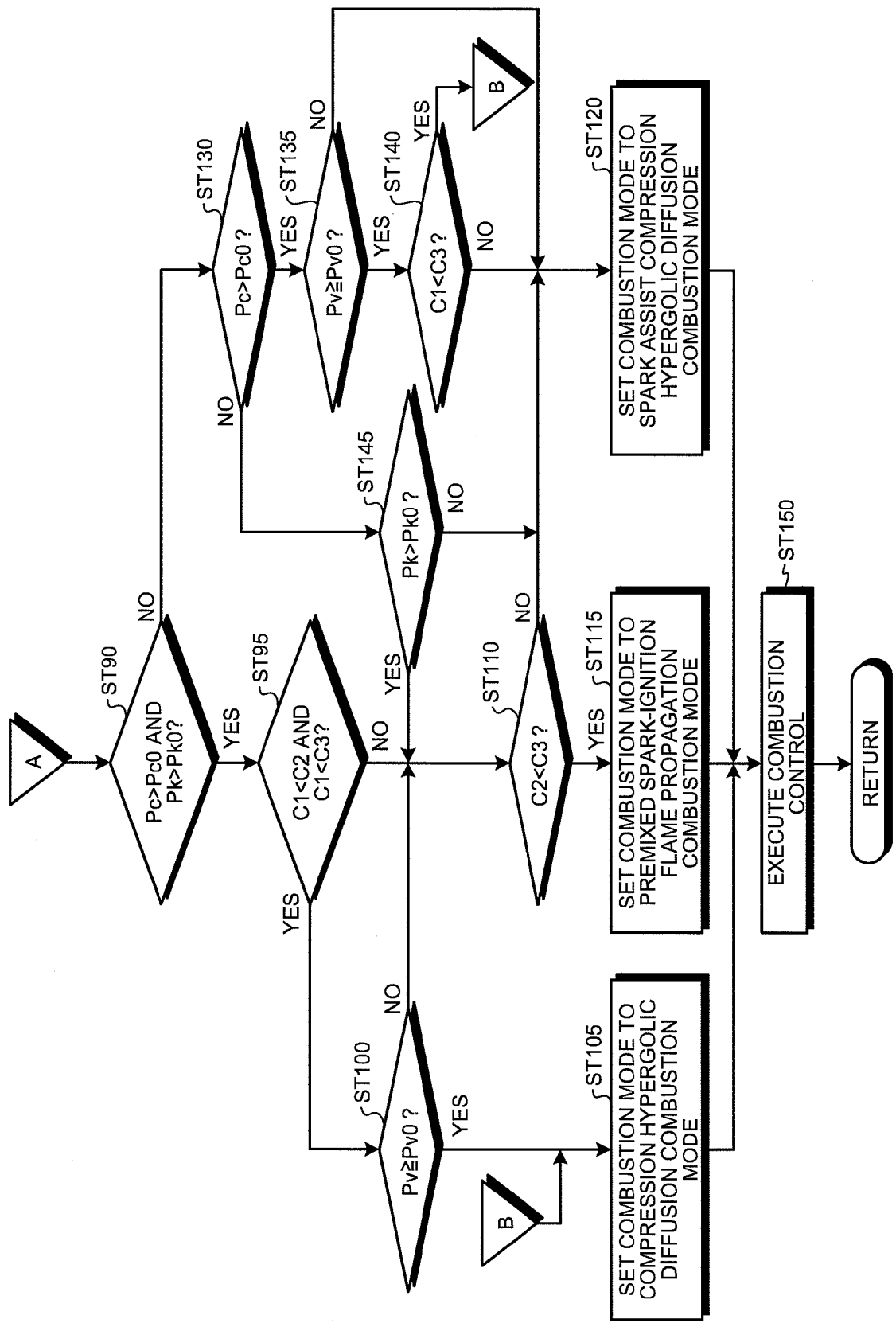
FIG. 8 is a flowchart for explaining operation of a multifuel internal combustion engine of the third embodiment, the operation continuing from the flowchart in FIG. 7.

Next, a third embodiment of the multifuel internal combustion engine according to the present invention will be explained based on FIGS. 7 and 8.

In the multifuel internal combustion engines of the first and second embodiments, even when a plurality of combustion modes which can be selected based on the characteristics of fuel introduced into the combustion chamber CC exist, only a predetermined combustion mode which is preset in accordance with fuel characteristics is selected. For example, when the fuel has high ignitability in the first embodiment, or the fuel has high ignitability and high evaporativity in the second embodiment, even if the anti-knocking performance is high, and the engine can be driven in the premixed spark-ignition flame propagation combustion mode, the compression hypergolic diffusion combustion mode is selected. In the first and second embodiments, in the case of such fuel, the compression hypergolic diffusion combustion mode is selected in order to enhance the output.

However, even if the kind of fuel characteristics is the same and the same combustion mode is thus selected, in the first and second embodiments, there is a certain range of fuel characteristics, and a combustion mode which is selected in the first and second embodiments may not be always the best depending upon the fuel characteristics of fuel in the strict sense. For example, if the above example is used, the premixed spark-ignition flame propagation combustion mode is more desirable than the compression hypergolic diffusion combustion mode in some cases in terms of fuel consumption performance or emission control performance.

Hence, in the third embodiment, estimated fuel consumption and estimated emission discharge amount of each combustion mode in accordance with fuel characteristics and driving condition (the revolution Ne of the engine and engine load Kl) of fuel introduced into the combustion chamber CC are taken into account, and a combustion mode which is excellent in both or any one of fuel consumption performance and emission control performance is selected. Although a structure based on the second embodiment will be shown in the following description, the same idea can also be used for a structure based on the first embodiment.

More specifically, in the third embodiment, the combustion mode setting means is constituted such that index values ("estimated fuel consumption/emission index values", hereinafter) C1, C2 and C3 capable of comprehensibly determining a degree of estimated fuel consumption and a degree of estimated emission discharge amount of each combustion mode can be selected. For example, the estimated fuel consumption/emission index values C1, C2 and C3 of each combustion mode are obtained using the following equations 1 to 3 based on index values ("estimated fuel consumption index values", hereinafter) Cf1, Cf2 and Cf3 in which a degree of estimated fuel consumption of each combustion mode is expressed by means of indexes; index values ("estimated emission index values", hereinafter) Ce1, Ce2 and Ce3 in which a degree of estimated emission discharge amount of each combustion mode is expressed by means of indexes; and weights ("fuel consumption/emission control performance weights", hereinafter) k1, k2 and k3 between the estimated fuel consumption and the estimated emission discharge amount of each combustion mode.

$$C1 = Cf1 + Ce1 \times k1 \quad (1)$$

$$C2 = Cf2 + Ce2 \times k2 \quad (2)$$

$$C3 = Cf3 + Ce3 \times k3 \quad (3)$$

Here, "C1", "C2" and "C3" mean an estimated fuel consumption/emission index value ("estimated fuel consumption/emission index value at the time of compression hypergolic diffusion combustion", hereinafter) when the engine is driven in the compression hypergolic diffusion combustion mode; an estimated fuel consumption/emission index value ("estimated fuel consumption/emission index value at the time of premixed spark-ignition flame propagation combustion", hereinafter) when the engine is driven in the premixed spark-ignition flame propagation combustion mode; and an estimated fuel consumption/emission index value ("estimated fuel consumption/emission index value at the time of spark assist compression hypergolic diffusion combustion", hereinafter) when the engine is driven in the spark assist compression hypergolic diffusion combustion mode, respectively. Here, as the numerical value is smaller, the fuel consumption performance and emission control performance are more excellent. Therefore, in the third embodiment, the combustion mode setting means is constituted such that when a plurality of combustion modes can be selected, a combustion mode having the smallest numerical value among "C1", "C2" and "C3" is selected.

Further, "Cf1", "Cf2" and "Cf3" mean an estimated fuel consumption index value ("an estimated fuel consumption index value at the time of compression hypergolic diffusion combustion" hereinafter) when the engine is driven in the compression hypergolic diffusion combustion mode; an estimated fuel consumption index value (an estimated fuel consumption index value at the time of premixed spark-ignition flame propagation combustion, hereinafter) when the engine is driven in the premixed spark-ignition flame propagation combustion mode; and an estimated fuel consumption index value ("an estimated fuel consumption index value at the time of spark assist compression hypergolic diffusion combustion", hereinafter) when the engine is driven in the spark assist compression hypergolic diffusion combustion mode, respectively. Here, as the numerical value is smaller, the fuel consumption performance is more excellent.

As shown in the following equations 4 to 6, the estimated fuel consumption index values Cf1, Cf2 and Cf3 of each combustion mode are calculated based on the driving condition (the revolution Ne of the engine and engine load Kl) and fuel characteristics of fuel introduced into the combustion chamber CC (ignitability index value Pc, anti-knocking performance index value Pk and evaporativity index value Pv). An experiment or simulation is previously carried out, and a correspondence relation of each parameter in the equations 4 to 6 is set based on the result of the experiment or simulation.

$$Cf1 = Fc1(Ne, Kl, Pc, Pk, Pv) \quad (4)$$

$$Cf2 = Fc2(Ne, Kl, Pc, Pk, Pv) \quad (5)$$

$$Cf3 = Fc3(Ne, Kl, Pc, Pk, Pv) \quad (6)$$

Here, "Ce1", "Ce2" and "Ce3" mean an estimated emission index value ("an estimated emission index value at the time of compression hypergolic diffusion combustion", hereinafter) when the engine is driven in the compression hypergolic diffusion combustion mode; an estimated emission index value ("an estimated emission index value at the time of premixed spark-ignition flame propagation combustion", hereinafter) when the engine is driven in the premixed spark-ignition flame propagation combustion; and an estimated emission index value ("estimated emission index value at the time of spark assist compression hypergolic diffusion combustion", hereinafter) when the engine is driven in the spark assist compression hypergolic diffusion combustion mode, respectively. Here, as the numerical value is smaller, the emission control performance is more excellent.

As shown in the following equations 7 to 9, the estimated emission index values Ce1, Ce2 and Ce3 in each combustion mode are calculated based on the driving condition (the revolution Ne of the engine and engine load Kl) and characteristics of fuel introduced into the combustion chamber CC (ignitability index value Pc, anti-knocking performance index value Pk and evaporativity index value Pv). An experiment or simulation is previously carried out, and a correspondence relation of each parameter in the equations 7 to 9 is set based on the result of the experiment or simulation.

$$Ce1 = Gc1(Ne, Kl, Pc, Pk, Pv) \quad (7)$$

$$Ce2 = Gc2(Ne, Kl, Pc, Pk, Pv) \quad (8)$$

$$Ce3 = Gc3(Ne, Kl, Pc, Pk, Pv) \quad (9)$$

Map data sets corresponding to the equations 4 to 9 may be prepared, and the estimated fuel consumption index values Cf1, Cf2 and Cf3 and the estimated emission index values Ce1, Ce2 and Ce3 in each combustion mode may be obtained from the map data sets.

Here, "k1", "k2" and "k3" mean fuel consumption/emission control performance weights (fuel consumption/emission control performance weights at the time of compression hypergolic diffusion combustion", hereinafter) when the engine is drive in the compression hypergolic diffusion combustion mode; fuel consumption/emission control performance weights ("fuel consumption/emission control performance weights at the time of the premixed spark-ignition flame propagation combustion", hereinafter) when the engine is drive in the premixed spark-ignition flame propagation combustion mode; and fuel consumption/emission control performance weights ("fuel consumption/emission control performance weights at the time of the spark assist compression hypergolic diffusion combustion", hereinafter) when the engine is drive in the spark assist compression hypergolic diffusion combustion mode, respectively.

The fuel consumption/emission control performance weights k1, k2 and k3 in the combustion modes change depending upon whether the fuel consumption performance should be enhanced or emission control performance should be enhanced and in this example, as the numeric value becomes smaller, the emission control performance is more enhanced. For example, the fuel consumption/emission control performance weights k1, k2 and k3 in these modes may be obtained by the combustion mode setting means in accordance with a fuel remaining amount or an actual emission discharge amount. In this case, the correspondence relation may be prepared in the form of map data based on a result of previously conducted experiment or simulation. The fuel consumption/emission control performance weights k1, k2 and k3 in these combustion modes may be designated by a driver. In this case, information such as the fuel remaining amount and the actual emission discharge amount may be displayed on an instrumental panel or the like and the fuel consumption/emission control performance weights k1, k2 and k3 determined by a driver based on the information may be input from the input device.

One example of control operation of the electronic control unit 1 in the third embodiment will be explained based on flowcharts in FIGS. 7 and 8. Redundant contents overlapping the control operation of the second embodiment will be omitted or simplified as need arises.

First, characteristics (ignitability index value Pc, anti-knocking performance index value Pk and evaporativity index value Pv) of fuel introduced into the combustion chamber CC detected by the fuel characteristics determining means in the same manner as that of the second embodiment, and driving condition (the revolution Ne of the engine and engine load Kl) are input to the electronic control unit 1 of the third embodiment (Steps ST55 and ST60). The combustion mode setting means of the electronic control unit 1 obtains the combustion mode switching condition (ignitability limit value Pc0, anti-knocking performance limit value Pk0 and evaporativity limit value Pv0) in accordance with the driving condition (the revolution Ne of the engine and engine load Kl) in Step ST60 in the same manner as that of the second embodiment (Step ST65).

Next, the combustion mode setting means of the third embodiment obtains the estimated fuel consumption index values Cf1, Cf2 and Cf3 in each combustion mode, the estimated emission index values Ce1, Ce2 and Ce3 in each combustion mode and the fuel consumption/emission control performance weights k1, k2 and k3 in each combustion mode, respectively as described above (Steps ST70, ST75, ST80), and the combustion mode setting means substitutes them into the equations 1 to 3 and calculates the estimated fuel consumption/emission index values C1, C2 and C3 in each combustion mode (Step ST85).

The combustion mode setting means compares the ignitability index value Pc and the ignitability limit value Pc0, along with the anti-knocking performance index value Pk and the anti-knocking performance limit value Pk0, respectively (Pc>Pc0 and Pk>Pk0?), and the combustion mode setting means determines whether fuel introduced into the combustion chamber CC has high ignitability and high anti-knocking performance (Step ST90).

If Yes in Step ST90 and it becomes apparent that the fuel introduced into the combustion chamber CC has high ignitability and high anti-knocking performance, the combustion mode setting means compares the estimated fuel consumption/emission index value C1 at the time of the compression hypergolic diffusion combustion with the estimated fuel consumption/emission index value C2 at the time of the premixed spark-ignition flame propagation combustion and the estimated fuel consumption/emission index value C3 at the time of the spark assist compression hypergolic diffusion combustion (C1<C2 and C1<C3?), and the combustion mode setting means determines whether the compression hypergolic diffusion combustion mode driving is most excellent in the fuel consumption performance and the emission control performance (Step ST95).

At that time, if Yes in Step ST95 and it becomes apparent that the compression hypergolic diffusion combustion mode driving is most excellent in the fuel consumption performance and emission control performance, the combustion mode setting means compares the evaporativity index value Pv and the evaporativity limit value Pv0 with each other, and determines a good or poor of evaporativity of fuel introduced into the combustion chamber CC (Step ST100). If the fuel has high evaporativity, it is possible to suppress generation of PM and smoke and thus, the compression hypergolic diffusion combustion mode is set as the combustion mode (Step ST105).

On the other hand, if No in Step ST95 and it becomes apparent that driving in a combustion mode other than the compression hypergolic diffusion combustion mode is most excellent in the fuel consumption performance and emission control performance, or if No in Step ST100 and it becomes apparent that fuel introduced into the combustion chamber CC has poor evaporativity, the combustion mode setting means compares the estimated fuel consumption/emission index value C2 at the time of the premixed spark-ignition flame propagation combustion and the estimated fuel consumption/emission index value C3 at the time of the spark assist compression hypergolic diffusion combustion with each other (C2<C3?), and determines which one of the combustion modes is most excellent in the fuel consumption performance and emission control performance (Step ST110).

At that time, if the estimated fuel consumption/emission index value C2 at the time of the premixed spark-ignition flame propagation combustion is smaller, the combustion mode setting means sets the premixed spark-ignition flame propagation combustion mode as the combustion mode (Step ST115), and if the estimated fuel consumption/emission index value C3 at the time of the spark assist compression hypergolic diffusion combustion is smaller, the combustion mode setting means sets the spark assist compression hypergolic diffusion combustion mode as the combustion mode (Step ST120). In this flowchart, it is determined No when the estimated fuel consumption/emission index values C2 and C3 at the time of the premixed spark-ignition flame propagation combustion and at the time of the spark assist compression hypergolic diffusion combustion are the same, respectively, but the combustion mode setting means may determine Yes in that case.

If No in Step ST90 and it becomes apparent that fuel introduced into the combustion chamber CC does not have high ignitability or high anti-knocking performance, the combustion mode setting means compares the ignitability index value Pc and the ignitability limit value Pc0 with each other (Pc>Pc0?), and the combustion mode setting means determines whether the ignitability of fuel introduced into the combustion chamber CC is good or poor (Step ST130).

If Yes in Step ST130 and it becomes apparent that the fuel has high ignitability, the combustion mode setting means compares the evaporativity index value Pv and the evaporativity limit value Pv0 with each other, and the combustion mode setting means determines whether the evaporativity of fuel introduced into the combustion chamber CC is good or poor same as in Step ST100 (Step ST135).

Here, if the combustion mode setting means determines in Step ST135 that the fuel is poor in evaporativity, the procedure advances to Step ST120, and the combustion mode setting means sets the spark assist compression hypergolic diffusion combustion mode as the combustion mode, and if the combustion mode setting means determines that the fuel has high evaporativity in Step ST135, the combustion mode setting means compares the estimated fuel consumption/emission index value C1 at the time of the compression hypergolic diffusion combustion and the estimated fuel consumption/emission index value C3 at the time of the spark assist compression hypergolic diffusion combustion with each other (C1<C3?), and the combustion mode setting means determines which one of the combustion modes has most excellent fuel consumption performance and emission control performance (Step ST140).

If the estimated fuel consumption/emission index value C1 at the time of the compression hypergolic diffusion combustion is smaller, the procedure advances to Step ST105, and the compression hypergolic diffusion combustion mode is set as the combustion mode. If the estimated fuel consumption/emission index value C3 at the time of the spark assist compression hypergolic diffusion combustion is smaller, the procedure advances to Step ST120, and the spark assist compression hypergolic diffusion combustion mode is set as the combustion mode. In this flowchart, it is determined No when the estimated fuel consumption/emission index values C1 and C3 at the time of the compression hypergolic diffusion combustion and at the time of the spark assist compression hypergolic diffusion combustion, respectively are the same, but the combustion mode setting means may determine Yes in that case.

When No in Step ST130 and it becomes apparent that the fuel has poor ignitability, the combustion mode setting means compares the evaporativity index value Pv and evaporativity limit value Pv0 with each other (Pk>Pk0?), and the combustion mode setting means determines whether the anti-knocking performance of fuel introduced into the combustion chamber CC is good or poor (Step ST145).

When the fuel has high anti-knocking performance, because there is no problem even if the engine is driven in the premixed spark-ignition flame propagation combustion mode, the procedure once advances to Step ST110, the combustion mode setting means determines which one of the premixed spark-ignition flame propagation combustion mode and spark assist compression hypergolic diffusion combustion mode is the most excellent in the fuel consumption performance and emission control performance, and the combustion mode setting means sets one of the modes as the combustion mode in accordance with the result of the determination. If the fuel has poor anti-knocking performance, combustion failure occurs if the engine is driven in the premixed spark-ignition flame propagation combustion mode, the procedure advances to Step ST120, and the combustion mode setting means sets the spark assist compression hypergolic diffusion combustion mode as the combustion mode.

In the third embodiment also, the combustion control execution means of the electronic control unit 1 executes control of the combustion such that the engine is driven at the theoretical air fuel ratio in the combustion mode which is set in this manner (Step ST150).

With this, when fuel introduced into the combustion chamber CC has fuel characteristics with which the multifuel internal combustion engine of the third embodiment can be driven excellently in a plurality of kinds of combustion modes, the multifuel internal combustion engine of the third embodiment can be driven at the theoretical air fuel ratio in a combustion mode which is excellent in both or any one of the fuel consumption performance and emission control performance. Therefore, in the multifuel internal combustion engine of the third embodiment, optimal combustion control according to the fuel characteristics is carried out, excellent engine performance (output performance, emission control performance and fuel consumption performance) can be exhibited, and the fuel consumption performance and emission control performance can further be enhanced.

In the third embodiment, the combustion mode to be changed is selected while taking both the fuel consumption performance and emission control performance into account, but the combustion mode setting means may be constituted such that the combustion mode is changed to a mode which is excellent only in one of the fuel consumption performance and emission control performance. For example, when the combustion mode is changed to a combustion mode which is excellent in fuel consumption performance, determination may be made while replacing "C1", "C2", and "C3" after Step ST95 shown in FIG. 8 with "Cf1", "Cf2", and "Cf3", respectively, and when the combustion mode is changed to a combustion mode which is excellent in the emission control performance, determination may be made while replacing "C1", "C2", and "C3" after Step ST95 with "Ce1", "Ce2", and "Ce3", respectively.

Fourth Embodiment

Figure 9:
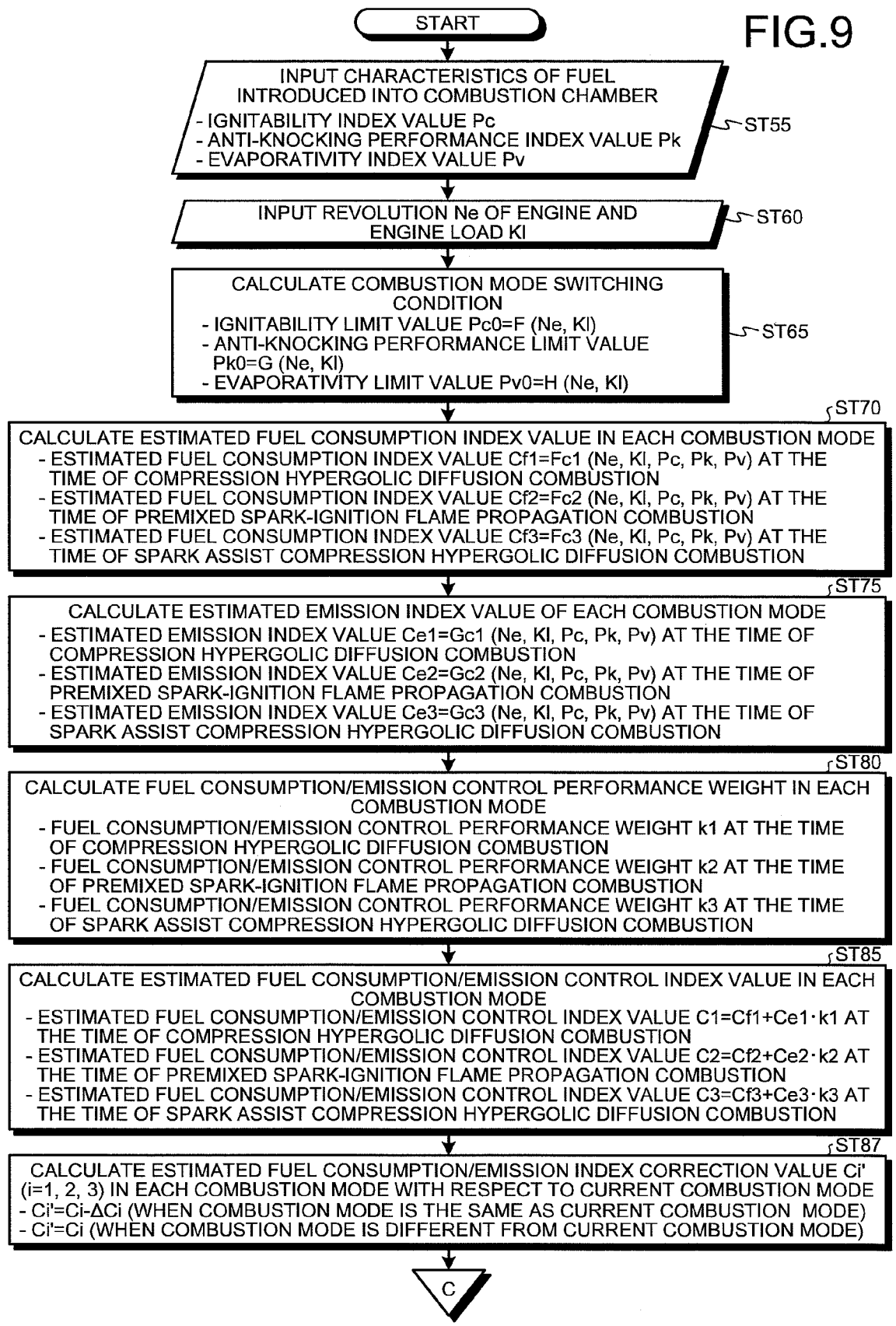
FIG. 9 is a flowchart for explaining operation of a multifuel internal combustion engine of the fourth embodiment.
Figure 10:
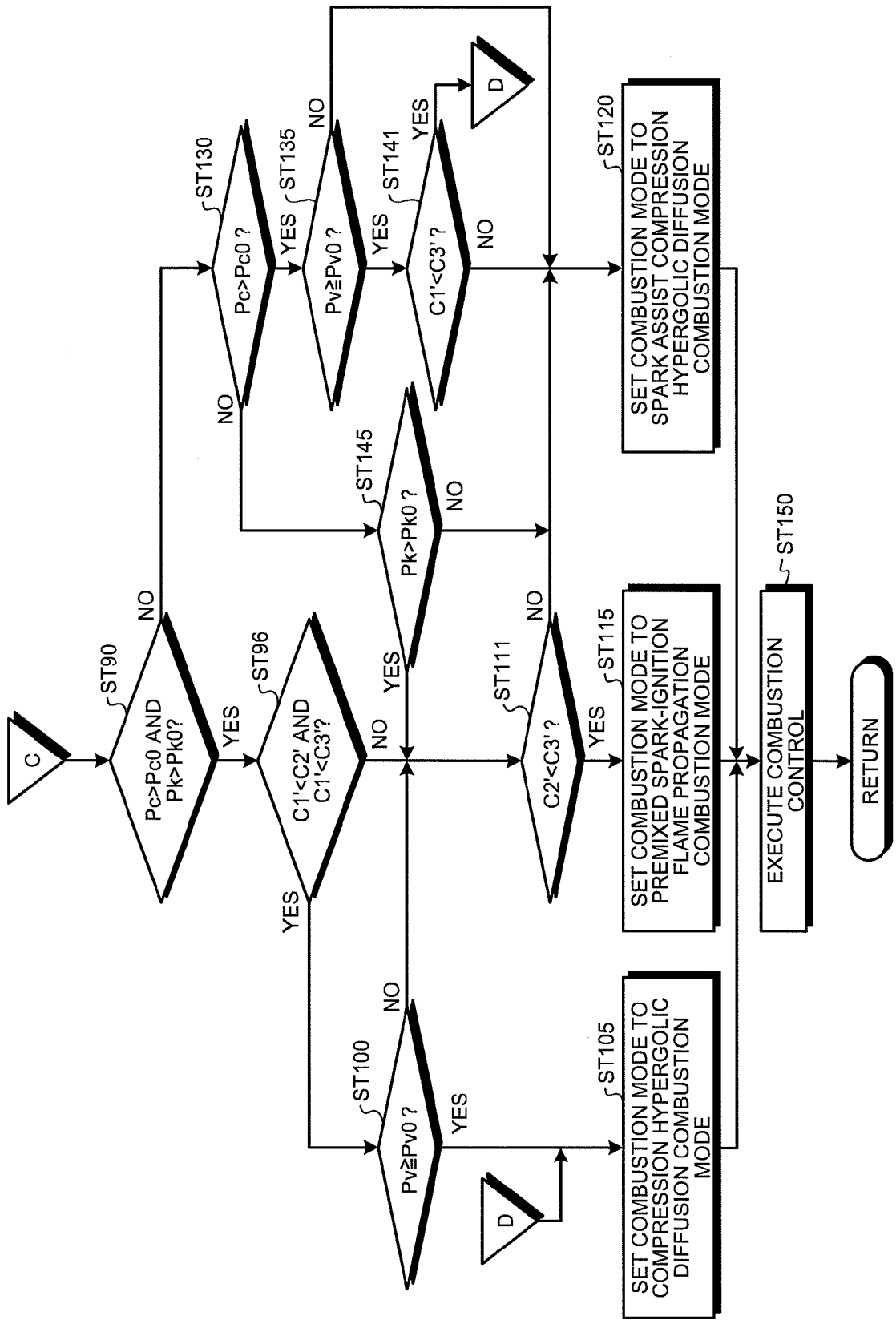
FIG. 10 is a flowchart for explaining operation of a multifuel internal combustion engine of the fourth embodiment, the operation continuing from the flowchart in FIG. 9.

Next, a fourth embodiment of the multifuel internal combustion engine according to the present invention will be explained based on FIGS. 9 and 10.

In the multifuel internal combustion engine of the third embodiment, when fuel introduced into the combustion chamber CC has fuel characteristics with which the engine can be driven excellently in a plurality of combustion modes, a combustion mode which is excellent in the fuel consumption performance or emission control performance is selected. However, because immediately after the combustion mode is changed the combustion state becomes instable due to variation in the air-fuel ratio and variation in EGR (Exhaust Gas Recirculation) amount at the time of the change, it is not preferable to change the combustion mode frequently.

In the fourth embodiment, a combustion mode is not changed until an improving margin of the fuel consumption performance and emission control performance caused by changing from the current combustion mode exceed a predetermined degree so that the combustion mode is not changed if the fuel consumption performance or emission control performance is enhanced only slightly.

More specifically, in the fourth embodiment, the estimated fuel consumption/emission index values C1, C2 and C3 of each combustion mode in the third embodiment show a comprehensive improving margin of the fuel consumption performance and emission control performance in each combustion mode. Thus, it may be determined whether the current combustion mode should be changed by comparing the estimated fuel consumption/emission index values C1, C2 and C3 in each combustion mode and predetermined threshold values with each other, or it may be determined whether the current combustion mode should be changed by correcting the estimated fuel consumption/emission index values C1, C2 and C3 in each combustion mode in accordance with the current combustion mode. In the fourth embodiment, the latter case will be explained.

Here, the combustion mode setting means is constituted such that correction values ("estimated fuel consumption/ emission index correction value", hereinafter) C1', C2' and C3' of the estimated fuel consumption/emission index values C1, C2 and C3 in each combustion mode are obtained, they are replaced with the estimated fuel consumption/emission index values C1, C2 and C3 in each combustion mode and the combustion mode is selected.

Here, C1', C2' and C3' respectively mean an estimated fuel consumption/emission index correction value ("estimated fuel consumption/emission index correction value at the time of the compression hypergolic diffusion combustion", hereinafter) when the engine is driven in the compression hypergolic diffusion combustion mode; an estimated fuel consumption/emission index correction value ("an estimated fuel consumption/emission index correction value at the time of the premixed spark-ignition flame propagation combustion", hereinafter) when the engine is driven in the premixed spark-ignition flame propagation combustion mode; and an estimated fuel consumption/emission index correction value ("estimated fuel consumption/emission index correction value at the time of the spark assist compression hypergolic diffusion combustion", hereinafter) when the engine is driven in the spark assist compression hypergolic diffusion combustion mode.

As numeric values of the C1', C2' and C3' are smaller, the fuel consumption performance and emission control performance are more excellent, and the combustion mode setting means is constituted such that when a plurality of combustion modes can be selected, a combustion mode having the smallest numeric value among them is selected. Therefore, the estimated fuel consumption/emission index value C1 (C2, C3) having the same combustion mode as the current combustion mode is corrected to a smaller value, the estimated fuel consumption/emission index value C1 (C2, C3) of a combustion mode which is different from the current combustion mode is corrected to a greater value or maintained as it is so that the current combustion mode is prone to be selected.

Therefore, in the fourth embodiment, the estimated fuel consumption/emission index correction values C1', C2' and C3' in each mode with respect to the current combustion mode are calculated using the following equations 10 and 11.

$$Ci' = Ci - \Delta Ci \ (i=1, 2, 3) \quad (10)$$

$$Ci' = Ci \ (i=1, 2, 3) \quad (11)$$

The equation 10 is used when the calculated estimated fuel consumption/emission index value C1 (C2, C3) is a combustion mode which is the same as the current combustion mode. The equation 11 is used when the calculated estimated fuel consumption/emission index value C1 (C2, C3) is a combustion mode which is different from the current combustion mode.

The correction term $\Delta Ci$ shows a comprehensive hysteresis of the fuel consumption performance and emission control performance in each combustion mode. For example, an experiment or simulation is carried out, and such a value that it is determined that even if a combustion state becomes instable due to change of combustion mode, a merit which can be obtained by improvement of the fuel consumption performance or emission control performance is greater may previously be prepared. The absolute value of a difference between the estimated fuel consumption/emission index value C1 (C2, C3) of a combustion mode after the change at that time, and the estimated fuel consumption/emission index value C1 (C2, C3) of the same combustion mode as the current combustion mode can be used.

One example of control operation of the electronic control unit 1 of the fourth embodiment will be explained based on flowcharts shown in FIGS. 9 and 10. Redundant contents overlapping the control operation of the third embodiment will be omitted or simplified as need arises.

The electronic control unit 1 of the fourth embodiment calculates the estimated fuel consumption/emission index values C1, C2 and C3 in each mode as in the third embodiment (Steps ST55 to ST85).

In the fourth embodiment, the combustion mode setting means of the electronic control unit 1 calculates the estimated fuel consumption/emission index correction values C1', C2' and C3' in each mode with respect to the current combustion mode based on the equations 10 and 11 (Step ST87).

The combustion mode setting means compares the ignitability index value Pc with the ignitability limit value Pc0, compares the anti-knocking performance index value Pk with the anti-knocking performance limit value Pk0 (Pc>Pc0 and Pk>Pk0?), and determines whether the fuel introduced into the combustion chamber CC has high ignitability and high evaporativity (Step ST90).

If Yes in Step ST90 and it becomes apparent that the fuel introduced into the combustion chamber CC has high ignitability and high evaporativity, the combustion mode setting means of the fourth embodiment compares the estimated fuel consumption/emission index correction value C1' at the time of the compression hypergolic diffusion combustion with the estimated fuel consumption/emission index correction value C2' at the time of the premixed spark-ignition flame propagation combustion and with the estimated fuel consumption/ emission index correction value C3' at the time of the spark assist compression hypergolic diffusion combustion (C1'<C2' and C1'<C3'?), and determines whether the compression hypergolic diffusion combustion mode driving is most excellent in fuel consumption performance and emission control performance (Step ST96).

If Yes in Step ST96, the procedure advances to Step ST100 as in the third embodiment, and a combustion mode according to the determination result is set. In the fourth embodiment, if No in Step ST100, the procedure advances to Step ST111.

If No in Step ST96, the combustion mode setting means of the fourth embodiment compares the estimated fuel consumption/emission index correction value C2' at the time of the premixed spark-ignition flame propagation combustion with the estimated fuel consumption/emission index correction value C3' at the time of the spark assist compression hypergolic diffusion combustion (C2'<C3'?), and determines which one of the combustion modes is the most excellent in fuel consumption performance and emission control performance (Step ST111). In accordance with the determination result, the combustion mode setting means sets one of the premixed spark-ignition flame propagation combustion mode and the spark assist compression hypergolic diffusion combustion mode as the combustion mode.

When it becomes apparent through Steps ST90, ST130 and ST135 that fuel introduced into the combustion chamber CC is poor in the anti-knocking performance but excellent in ignitability and evaporativity (when Yes in Step ST135), the combustion mode setting means of the fourth embodiment compares the estimated fuel consumption/emission index correction value C1' at the time of the compression hypergolic diffusion combustion with the estimated fuel consumption/emission index correction value C3' at the time of the spark assist compression hypergolic diffusion combustion (C1'<C3'?), and determines which one is more excellent in the fuel consumption performance and emission control performance (Step ST141). In accordance with the determination result, one of the compression hypergolic diffusion combustion mode and the spark assist compression hypergolic diffusion combustion mode is set as the combustion mode.

In the fourth embodiment also, the combustion control execution means of the electronic control unit 1 executes a combustion control such that the engine is driven at the theoretical air fuel ratio in the combustion mode which is set in this manner (Step ST150).

The multifuel internal combustion engine of the fourth embodiment exhibits the same effect as that of the multifuel internal combustion engine of the third embodiment, but the current combustion mode is maintained unless the fuel consumption performance or emission control performance is enhanced to a certain level unlike the third embodiment. Therefore, the combustion mode is not changed frequently. Therefore, in the multifuel internal combustion engine, it is possible to reduce the frequency of generation of instable combustion which may be caused due to variation in air fuel ratio or variation in EGR amount when the combustion mode is changed.

The current combustion mode also becomes prone to be selected by correcting the estimated fuel consumption/emission index value C1 (C2, C3) in the same combustion mode as the current combustion mode to a smaller value or maintaining the same as it is, or by correcting the estimated fuel consumption/emission index value C1 (C2, C3) in the combustion mode which is different from the current combustion mode to a greater value. Therefore, the estimated fuel consumption/emission index correction values C1', C2' and C3' in each combustion mode with respect to the current combustion mode may be calculated using the following equations 12 and 13. In this case, the equation 12 is used when the calculated estimated fuel consumption/emission index value C1 (C2, C3) has the same combustion mode as the current combustion mode, and the equation 13 is used when the calculated estimated fuel consumption/emission index value C1 (C2, C3) has a combustion mode which is different from the current combustion mode.

$$Ci' = Ci \ (i=1, 2, 3) \tag{12}$$

$$Ci' = Ci + \Delta Ci \ (i=1, 2, 3) \tag{13}$$

Although the correction term $\Delta Ci$ is used, the estimated fuel consumption/emission index correction values C1', C2' and C3' in each combustion mode may be obtained by multiplying a correction coefficient, or the like.

Fifth Embodiment

Next, a fifth embodiment of the multifuel internal combustion engine according to the present invention will be explained based on FIGS. 11 and 12.

In the first to fourth embodiments, a so-called cylinder direct injection type multifuel internal combustion engine in which mixed fuel of the first fuel F1 and the second fuel F2 is directly injected into the combustion chamber CC is described, the setting operation of the combustion mode in the first to fourth embodiments may also be applied to a multifuel internal combustion engine having another structure.

Figure 11:
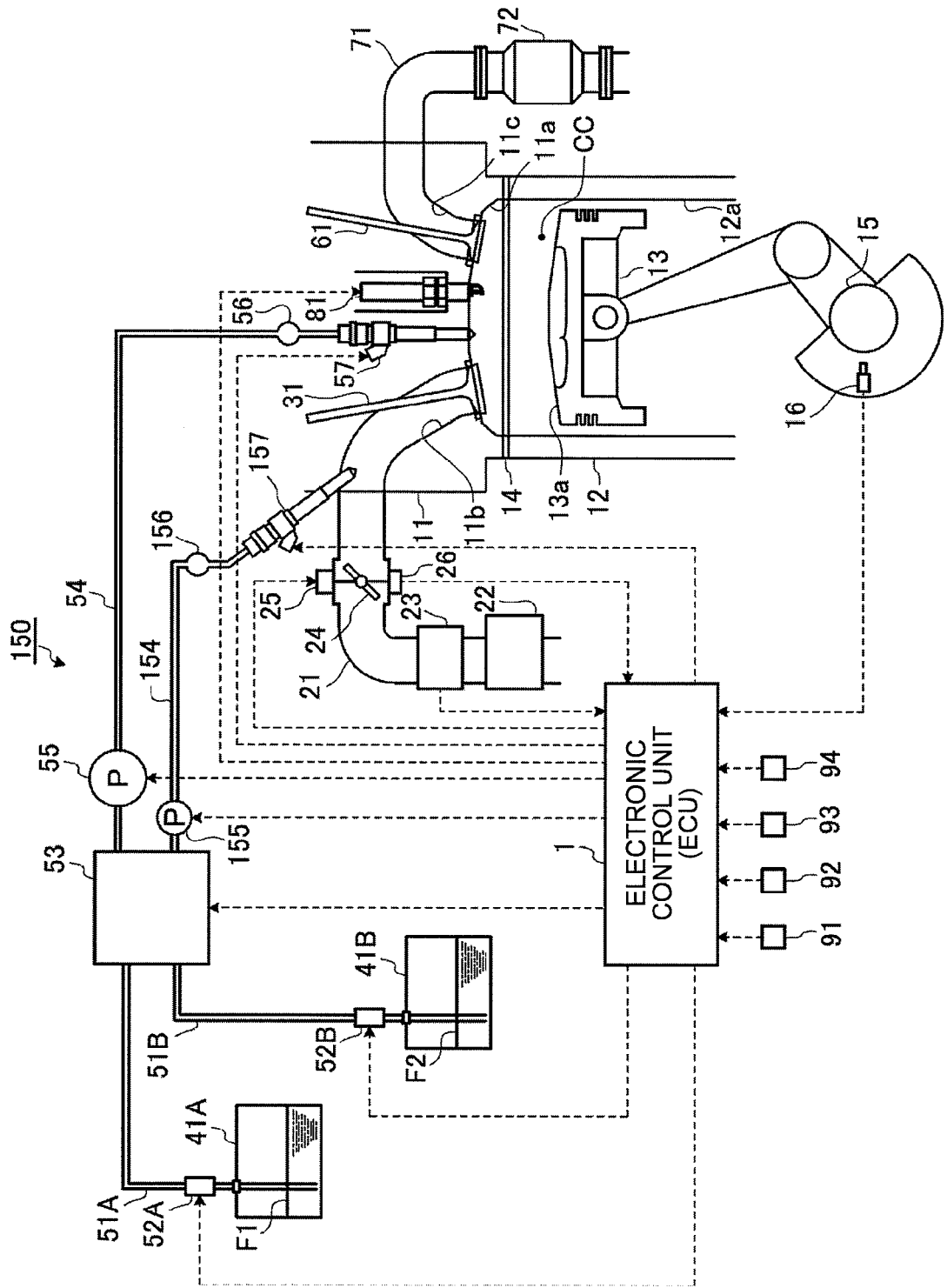
FIG. 11 is a diagram showing a structure of a fifth embodiment of the multifuel internal combustion engine according to the present invention.

For example, the combustion mode setting mode may be applied to a multifuel internal combustion engine constituted such that the fuel supply apparatus 50 in the multifuel internal combustion engine of the first to fourth embodiments is replaced with a fuel supply apparatus 150 shown in FIG. 11, and the mixed fuel of the first fuel F1 and the second fuel F2 is injected not only into the combustion chamber CC but also into the intake port 11b. With this also, the same effect as that of the multifuel internal combustion engine of each of the first to fourth embodiments can be exhibited.

The fuel supply apparatus 150 shown in FIG. 11 includes, in addition to the various constituent parts of the fuel supply apparatus 50 in the first to fourth embodiments, a fuel pump 155 which discharges mixed fuel produced by the fuel mixing means 53 to a fuel passage 154, a delivery passage 156 which distributes the mixed fuel of the fuel passage 154 to respective cylinders, and a fuel injection valve 157 provided in each cylinder for injecting the mixed fuel supplied from the delivery passage 156 into the intake port 11b in the each cylinder. When the multifuel internal combustion engine in this case is driven in the compression hypergolic diffusion combustion mode or the spark assist compression hypergolic diffusion combustion mode, the fuel injection valve 57 is driven and controlled to inject the mixed fuel into the combustion chamber CC, and when the engine is driven in the premixed spark-ignition flame propagation combustion mode, the fuel injection valve 157 is driven and controlled to inject the mixed fuel into the intake port 11b.

Figure 12:
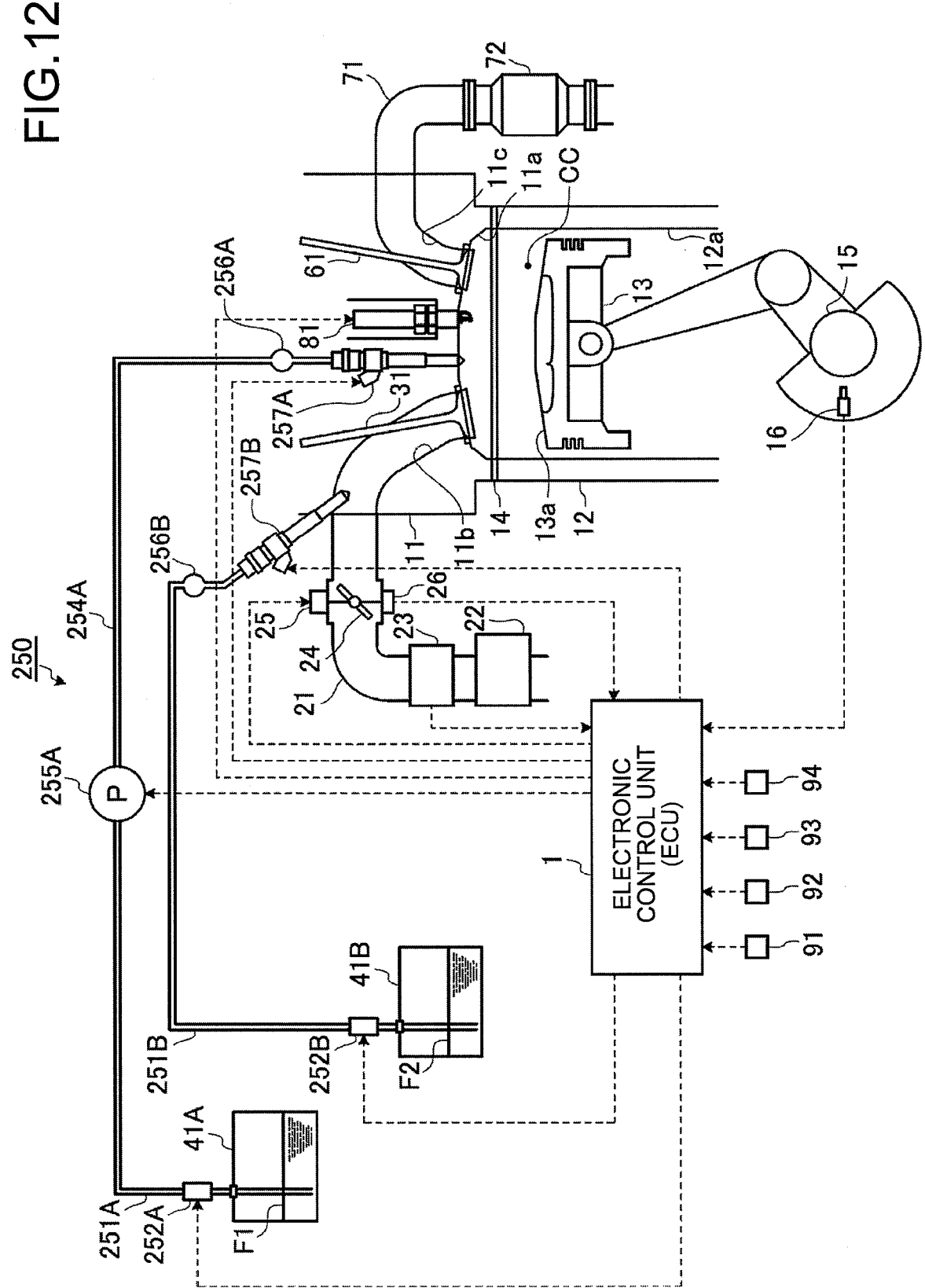
FIG. 12 is a diagram showing a structure of a modification of the fifth embodiment of the multifuel internal combustion engine according to the present invention.

The combustion mode setting operation may be applied to the multifuel internal combustion engine in which in the multifuel internal combustion engine of the first to fourth embodiments, the fuel supply apparatus 50 is replaced with a fuel supply apparatus 250 shown in FIG. 12, and the first fuel F1 and the second fuel F2 are individually injected without using the fuel mixing means 53. In this case also, the same effect as that of the multifuel internal combustion engine of the first to fourth embodiments can be exhibited.

The fuel supply apparatus 250 shown in FIG. 12 includes first fuel supply means which directly injects the first fuel F1 (high ignitability fuel) into the combustion chamber CC, and second fuel supply means which injects the second fuel F2 (high evaporativity fuel, high anti-knocking performance) into the intake port 11b. The first fuel supply means includes a first feed pump 252A which takes in the first fuel F1 from the first fuel tank 41A and sends the same to a first fuel passage 251A, a high pressure fuel pump 255A which sends the first fuel F1 of the first fuel passage 251A to the high pressure fuel passage 254A under pressure, a first delivery passage 256A which distributes the first fuel F1 of the high pressure fuel passage 254A to the cylinders, and a fuel injection valve 257A provided in each cylinder for injecting the first fuel F1 supplied from the first delivery passage 256A into the combustion chamber CC. The second fuel supply means includes a second feed pump 252B which takes in the second fuel F2 from the second fuel tank 41B and sends the same to the second fuel passage 251B, a second delivery passage 256B which distributes the second fuel F2 of the second fuel passage 251B to the cylinders, and a fuel injection valve 257B provided in each cylinder for injecting the second fuel F2 supplied from the second delivery passage 256B into the intake port 11b. In the multifuel internal combustion engine in this case, when the engine is driven in the compression hypergolic diffusion combustion mode or spark assist compression hypergolic diffusion combustion mode, only the fuel injection valve 257A or both the fuel injection valves 257A and 257B are driven and controlled to introduce fuel into the combustion chamber CC, and when the engine is driven in the premixed spark-ignition flame propagation combustion mode, only the fuel injection valve 257B or both the fuel injection valves 257A and 257B are driven and controlled to introduce fuel into the combustion chamber CC.

Although the multifuel internal combustion engine which is driven using two kinds of fuel has been described in each of the first to fifth embodiments, the combustion mode setting operation of the multifuel internal combustion engines of the first to fifth embodiments may be applied to a multifuel internal combustion engine which is driven using three or more kinds of fuel. In the first to fifth embodiments, each kind of fuel is stored in an independent fuel tank, but the combustion mode setting operation of the multifuel internal combustion engines of the first to fifth embodiments may be applied to a multifuel internal combustion engine in which all of the fuel is stored in one fuel tank at a predetermined fuel mixing ratio, and the engine is driven using the mixed fuel.

INDUSTRIAL APPLICABILITY

The multifuel internal combustion engine according to the present invention is effective for technique for setting optimal combustion mode according to fuel characteristics.

The invention claimed is:

1. A multifuel internal combustion engine which is driven mainly at a theoretical air fuel ratio by introducing at least one of at least two kinds fuel having different properties into a combustion chamber or by introducing mixed fuel including the at least two kinds of fuel into the combustion chamber, the multifuel internal combustion engine comprising:

fuel characteristics determining unit that determines ignitability and anti-knocking performance of the fuel introduced into the combustion chamber;

combustion mode setting unit that sets a compression hypergolic diffusion combustion mode when ignitability of the fuel introduced into the combustion chamber is excellent, sets a premixed spark-ignition flame propagation combustion mode when the ignitability of the fuel introduced into the combustion chamber is poor and anti-knocking performance is excellent, and sets a spark assist compression hypergolic diffusion combustion mode when both the ignitability and anti-knocking performance of the fuel introduced into the combustion chamber are poor; and combustion control execution unit that makes the engine to drive in a combustion mode which is set by the combustion mode setting unit.

2. The multifuel internal combustion engine according to claim 1, wherein the fuel characteristics determining unit further determines evaporativity or PM/smoke generating characteristics of the fuel introduced into the combustion chamber, and the combustion mode setting unit does not select the compression hypergolic diffusion combustion mode when the fuel introduced into the combustion chamber has poor evaporativity or the fuel easily generates PM or smoke.

3. The multifuel internal combustion engine according to claim 1, wherein when the fuel introduced into the combustion chamber has fuel characteristics that permit setting a plurality of kinds of combustion modes, the combustion mode setting unit selects a combustion mode which is excellent in both or any one of fuel consumption performance and emission control performance.

4. The multifuel internal combustion engine according to claim 2, wherein when the fuel introduced into the combustion chamber has fuel characteristics that permit setting a plurality of kinds of combustion modes, the combustion mode setting unit selects a combustion mode which is excellent in both or any one of fuel consumption performance and emission control performance.

5. The multifuel internal combustion engine according to claim 3, wherein when an improving margin of the fuel consumption performance and emission control performance caused by changing from the current combustion mode exceed a predetermined degree, the combustion mode setting unit executes changing of the combustion mode.

6. The multifuel internal combustion engine according to claim 4, wherein when an improving margin of the fuel consumption performance and emission control performance caused by changing from the current combustion mode exceed a predetermined degree, the combustion mode setting unit executes changing of the combustion mode.

7. The multifuel internal combustion engine according to claim 1, wherein at least one of at least two kinds fuel having different properties, or mixed fuel including the at least two kinds of fuel is introduced into the combustion chamber and an intake port.

8. A combustion controlling method of a multifuel internal combustion engine which is driven mainly at a theoretical air fuel ratio by introducing at least one of at least two kinds fuel having different properties into a combustion chamber or by introducing mixed fuel including the at least two kinds of fuel into the combustion chamber, the combustion controlling method comprising:

determining fuel characteristics with respect to ignitability and anti-knocking performance of the fuel introduced into the combustion chamber;

setting a compression hypergolic diffusion combustion mode when ignitability of the fuel introduced into the combustion chamber is excellent, setting a premixed spark-ignition flame propagation combustion mode when the ignitability of the fuel introduced into the combustion chamber is poor and anti-knocking performance is excellent, and setting a spark assist compression hypergolic diffusion combustion mode when both the ignitability and anti-knocking performance of the fuel introduced into the combustion chamber are poor; and executing combustion control to make the engine to drive in a combustion mode which is set in the combustion mode setting.

9. The combustion controlling method of the multifuel internal combustion engine according to claim 8, wherein the fuel characteristics determining further determines evaporativity or PM/smoke generating characteristics of the fuel introduced into the combustion chamber, and the combustion mode setting does not select the compression hypergolic diffusion combustion mode when the fuel introduced into the combustion chamber has poor evaporativity or the fuel easily generates PM or smoke.

10. The combustion controlling method of the multifuel internal combustion engine according to claim 8, wherein when the fuel introduced into the combustion chamber has fuel characteristics that permit setting a plurality of kinds of combustion modes, the combustion mode setting selects a combustion mode which is excellent in both or any one of fuel consumption performance and emission control performance.

11. The combustion controlling method of the multifuel internal combustion engine according to claim 9, wherein when the fuel introduced into the combustion chamber has fuel characteristics that permit setting a plurality of kinds of combustion modes, the combustion mode setting selects a combustion mode which is excellent in both or any one of fuel consumption performance and emission control performance.

12. The combustion controlling method of the multifuel internal combustion engine according to claim 10, wherein when an improving margin of the fuel consumption performance and emission control performance caused by changing from the current combustion mode exceed a predetermined degree, the combustion mode setting executes changing of the combustion mode.

13. The combustion controlling method of the multifuel internal combustion engine according to claim 11, wherein when an improving margin of the fuel consumption performance and emission control performance caused by changing from the current combustion mode exceed a predetermined degree, the combustion mode setting executes changing of the combustion mode.

14. The combustion controlling method of the multifuel internal combustion engine according to claim 8, wherein at least one of at least two kinds fuel having different properties, or mixed fuel including the at least two kinds of fuel is introduced into the combustion chamber and an intake port.

* * * * *